United States Patent
Nakagawa et al.

(10) Patent No.: US 12,371,598 B2
(45) Date of Patent: Jul. 29, 2025

(54) PRESSURE-SENSITIVE ADHESIVE COMPOSITION AND PRESSURE-SENSITIVE ADHESIVE SHEET

(71) Applicant: NITTO DENKO CORPORATION, Ibaraki (JP)

(72) Inventors: Muneshige Nakagawa, Ibaraki (JP); Hiroaki Takahashi, Ibaraki (JP); Fumika Kawatake, Ibaraki (JP); Nobukazu Negishi, Ibaraki (JP); Itsuhiro Hatanaka, Ibaraki (JP)

(73) Assignee: NITTO DENKO CORPORATION, Ibaraski (JP)

( * ) Notice: Subject to any disclaimer, the term of this patent is extended or adjusted under 35 U.S.C. 154(b) by 3 days.

(21) Appl. No.: 17/880,092

(22) Filed: Aug. 3, 2022

(65) Prior Publication Data
US 2023/0052577 A1    Feb. 16, 2023

(30) Foreign Application Priority Data

Aug. 6, 2021 (JP) .................... 2021-129928
May 18, 2022 (JP) .................... 2022-081262

(51) Int. Cl.
*C09J 153/02* (2006.01)
*C08K 5/00* (2006.01)
(Continued)

(52) U.S. Cl.
CPC ........... *C09J 153/02* (2013.01); *C08K 5/0016* (2013.01); *C08K 5/01* (2013.01); *C08K 5/03* (2013.01);
(Continued)

(58) Field of Classification Search
None
See application file for complete search history.

(56) References Cited

U.S. PATENT DOCUMENTS

| | | | | |
|---|---|---|---|---|
| 7,070,051 B2 * | 7/2006 | Kanner | ........... | A61B 17/06133 206/460 |
| 2015/0079385 A1 * | 3/2015 | Nishikawa | ................ | C09J 7/38 428/317.3 |

FOREIGN PATENT DOCUMENTS

| | | |
|---|---|---|
| EP | 3 345 979 A1 | 7/2018 |
| JP | 3994510 B2 | 10/2007 |

(Continued)

OTHER PUBLICATIONS

JP2019-147891 English Machine Translation.*
Extended European Search Report dated Dec. 5, 2022 in European Application No. 22187034.8.

*Primary Examiner* — Frank D Ducheneaux
(74) *Attorney, Agent, or Firm* — Sughrue Mion, PLLC

(57) ABSTRACT

A PSA composition comprising a block copolymer of a monovinyl-substituted aromatic compound and a conjugated diene compound, a tackifier resin, and a softening agent is provided. The tackifier resin comprises a natural product-based tackifier resin (A) having a softening point higher than 80° C. and containing no aromatic ring, and a petroleum-based tackifier resin (B) having a softening point higher than 100° C. and containing an aromatic ring. The content of the tackifier resin (A) is 40 to 120 parts by weight, the content of the tackifier resin (B) is 5 to 40 parts by weight, the total amount of the tackifier resin is 60 to 160 parts by weight, and the content of the softening agent is 5 to 40 parts by weight with respect to 100 parts by weight of the block copolymer, with respect to 100 parts by weight of the block copolymer.

19 Claims, 2 Drawing Sheets

(51) Int. Cl.
  *C08K 5/01* (2006.01)
  *C08K 5/03* (2006.01)
  *C09J 7/38* (2018.01)
  *C09J 11/08* (2006.01)
  *C09J 191/00* (2006.01)
  *C09J 193/04* (2006.01)

(52) U.S. Cl.
  CPC .............. *C09J 7/387* (2018.01); *C09J 11/08* (2013.01); *C09J 191/00* (2013.01); *C09J 193/04* (2013.01); *C09J 2301/302* (2020.08); *C09J 2301/408* (2020.08); *C09J 2453/00* (2013.01)

(56) References Cited

FOREIGN PATENT DOCUMENTS

| | | | | |
|---|---|---|---|---|
| JP | 5864195 B2 | 2/2016 | | |
| JP | 2016-130283 A | 7/2016 | | |
| JP | 2019147891 A | * 9/2019 | .............. | C09J 11/08 |
| JP | 2020-164845 A | 10/2020 | | |

* cited by examiner

[FIG 1]
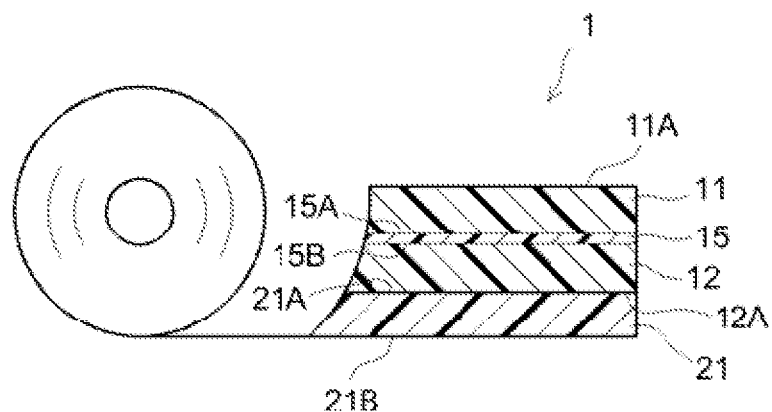
[FIG 2]
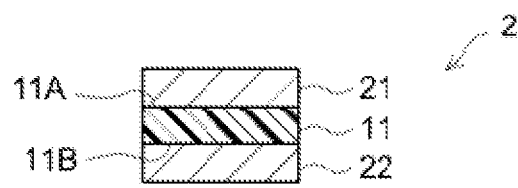
[FIG 3]
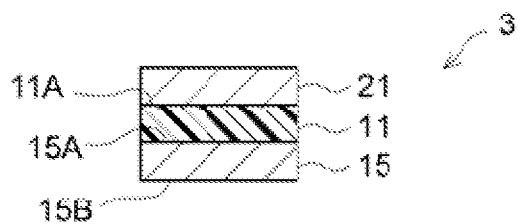

[FIG 4]
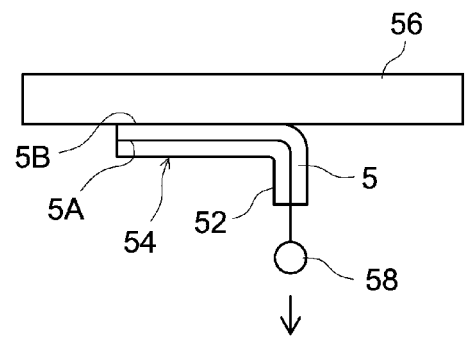

PRESSURE-SENSITIVE ADHESIVE COMPOSITION AND PRESSURE-SENSITIVE ADHESIVE SHEET

CROSS-REFERENCE

The present application claims priority based on Japanese Patent Application No. 2021-129928 filed on Aug. 6, 2021 and Japanese Patent Application No. 2022-081262 filed on May 18, 2022, and the entire contents of these applications are incorporated herein by reference.

BACKGROUND OF THE INVENTION

1. Field of the Invention

The present invention relates to a pressure-sensitive adhesive (hereinafter, referred to as PSA) composition comprising a block copolymer (for example, a styrene-based block copolymer) of a monovinyl-substituted aromatic compound and a conjugated diene compound. Further, the present invention relates to a PSA sheet comprising a PSA layer comprising the block copolymer.

2. Description of the Related Art

In general, a PSA exists as a soft solid (a viscoelastic material) at a room temperature range, and possesses the property by which it easily adheres to an adherend by the application of pressure. Utilizing such a property, PSA has been used as an attachment means having a good workability and a high adhesive reliability, in various industrial fields from home appliances to automobiles, OA equipment and the like. A typical composition of this kind of PSA comprises a polymer exhibiting rubber elasticity at room temperature and a tackifier resin. For example, Patent Literature 1 (Japanese Patent Application Publication No. 2020-164845), Patent Literature 2 (Japanese Patent No. 3994510) and Patent Literature 3 (Japanese Patent No. 5864195) disclose PSA comprising a styrene-based block copolymer such as a styrene-isoprene-styrene block copolymer or a styrene-butadiene-styrene block copolymer, and a tackifier resin.

SUMMARY OF THE INVENTION

The properties (specifically, the cohesive strength) of the PSAs containing a styrene-based block copolymer as described above tend to deteriorate at high temperatures compared to the adhesive properties at ambient temperature. For example, in Patent Literature 1, a specific styrene-based elastomer was used in combination with a specific tackifier resin to bring about an improvement in the adhesive strength at high temperature, but the cohesive strength at a high temperature has not been considered. Further, in Patent Literature 2, a PSA containing a styrene-isoprene-styrene block copolymer (SIS) and a C5-based petroleum tackifier resin was used to evaluate the heat resistance and the like, but in general, the softening point of a C5-based petroleum tackifier resin is less than 110° C. (in Patent Literature 2, a resin having a softening point at about 100° C. was used), thus, it is difficult to obtain a sufficient cohesive strength at a high temperature. Even in Patent Literature 3, only the composition containing a styrene-butadiene-styrene block copolymer (SBS) and a C5-based petroleum tackifier resin was examined, and in the same manner as Patent Literature 2, a sufficient cohesive strength at a high temperature cannot be anticipated. The compositions proposed in Patent Literatures 1 to 3 do not obtain a sufficient cohesive strength at a high temperature as illustrated in the following Comparative Examples.

When it is desired to improve the cohesive strength at a high temperature in the PSA comprising a styrene-based block copolymer, a relatively hard PSA which can exert cohesive strength even at a high temperature can be designed. However, this kind of PSA usually has a weak tack, and for example, the adhesion to a rough surface tends to decrease. In short, there is a trade off between the rough surface adhesion and the cohesive strength at a high temperature. Furthermore, in the PSA comprising a styrene-based block copolymer, some of the PSA materials which can improve the adhesive strength and cohesive strength have an influence on the preservability, which limits the selection of the PSA composition.

The present invention was created taking these circumstances into account, and it is the object of the present invention to provide a PSA composition which obtains both rough surface adhesion and a cohesive strength at a high temperature, and can form a PSA having a good preservability. Another related objective is to provide a PSA sheet having a good balance among the rough surface adhesion, the cohesive strength at a high temperature and the preservability.

According to this description, a PSA composition comprising a block copolymer of a monovinyl-substituted aromatic compound and a conjugated diene compound, a tackifier resin, and a softening agent is provided. In this PSA composition, the tackifier resin comprises a natural product-based tackifier resin (A) in which the softening point is in excess of 80° C. and containing no aromatic ring, and a petroleum-based tackifier resin (B) in which the softening point is in excess of 100° C. and containing an aromatic ring. Further, the content of the tackifier resin (A) is 40 to 120 parts by weight with respect to 100 parts by weight of the block copolymer. The content of the tackifier resin (B) is 5 to 40 parts by weight with respect to 100 parts by weight of the block copolymer. Furthermore, the total amount of the tackifier resin is 60 to 160 parts by weight with respect to 100 parts by weight of the block copolymer. Moreover, the content of the softening agent is 5 to 40 parts by weight with respect to 100 parts by weight of the block copolymer. According to the PSA composition, a PSA which obtains both a rough surface adhesion and a cohesive strength at a high temperature and has a good preservability can be formed with a composition comprising a block copolymer of a monovinyl-substituted aromatic compound and a conjugated diene compound.

In some preferable embodiments, the tackifier resin (A) comprises a terpene resin as a tackifier resin (A1), and a rosin-based resin as a tackifier resin (A2). By use of the terpene resin in combination with the rosin-based resin as the tackifier resin (A), the effect due to the technique disclosed herein is preferably realized.

In some preferable embodiments, the tackifier resin (A2) comprises a rosin-based resin having a softening point of 150° C. or above. A more superior cohesive strength at a high temperature can be obtained by use of a rosin-based resin having a high softening point as the tackifier resin (A2).

In the PSA composition according to some preferable embodiments, the content of the phenol-based tackifier resin is less than 1 part by weight with respect to 100 parts by weight of the block copolymer. By limiting the amount of the phenol-based tackifier resin used as described above, a PSA having a good preservability and superior quality stability such as adhesive properties can be preferably obtained.

In some embodiments, a styrene-based block copolymer is preferably used as the block copolymer. The effect due to the technique disclosed herein is preferably realized in the PSA comprising the styrene-based block copolymer. Specifically, the effect due to the technique disclosed herein may be suitably exhibited in the PSA comprising the styrene-isoprene block copolymer.

In some preferable embodiments, the styrene content of the styrene-based block copolymer is 10 to 22 wt %. By setting the content of the styrene-based block copolymer to this range, a PSA which obtains both adhesive strength and a cohesive strength at a high temperature can be easily obtained.

Further, this description also provides a PSA sheet having a PSA layer formed from the PSA composition disclosed herein. According to the PSA sheet, both a rough surface adhesion and a cohesive strength at a high temperature are obtained in the constitution comprising a PSA layer that comprises a block copolymer of a monovinyl-substituted aromatic compound and a conjugated diene compound. Further, the PSA sheet has a good preservability, and accordingly, even when stored for a long period of time, the quality stability such as the adhesive properties are excellent. The PSA sheet provided in this description comprises a PSA layer. The PSA layer comprises a block copolymer of a monovinyl-substituted aromatic compound and a conjugated diene compound, a tackifier resin, and a softening agent. The tackifier resin comprises a natural product-based tackifier resin (A) having a softening point in excess of 80° C. and containing no aromatic ring, and a petroleum tackifier resin (B) having a softening point in excess of 100° C. and containing an aromatic ring. The content of the tackifier resin (A) is 40 to 120 parts by weight with respect to 100 parts by weight of the block copolymer, the content of the tackifier resin (B) is 5 to 40 parts by weight with respect to 100 parts by weight of the block copolymer, the total amount of the tackifier resin is 60 to 160 parts by weight with respect to 100 parts by weight of the block copolymer, and the content of the softening agent is 5 to 40 parts by weight with respect to 100 parts by weight of the block copolymer.

Further, the PSA sheet provided in this description includes a PSA sheet having a PSA layer that comprises a block copolymer of a monovinyl-substituted aromatic compound and a conjugated diene compound, and a tackifier resin, in which the content of the phenol-based tackifier resin in the PSA layer is less than 1 part by weight with respect to 100 parts by weight of the block copolymer. This PSA sheet satisfies the following characteristics: having the adhesive strength to a soft urethane foam of 3 N/10 mm or greater, in which the adhesive strength is measured in an environment of 23° C. and 50% RH under the conditions of a tensile speed of 300 mm/min and a peel angle of 180 degrees; and, not falling off in a cohesive strength test for a stainless steel plate measured under the conditions of a temperature of 70° C., an adhered area of 10 mm×30 mm, a load of 500 g, and a holding time of 1 hour.

Note that, the scope of the invention for which the present patent application seeks patent protection may include a suitable combination of the features described in the description.

BRIEF DESCRIPTION OF THE DRAWINGS

FIG. 1 is a cross-sectional view schematically illustrating the constitution of a PSA sheet (a substrate-containing double-sided PSA sheet) according to an embodiment.

FIG. 2 is a cross-sectional view schematically illustrating the constitution of a PSA sheet (a double-sided PSA sheet without substrate) according to another embodiment.

FIG. 3 is a cross-sectional view schematically illustrating the constitution of a PSA sheet (a substrate-containing single-sided PSA sheet) according to another embodiment.

FIG. 4 is an explanatory drawing illustrating a method for the constant load peeling test.

DETAILED DESCRIPTION OF THE INVENTION

The preferred embodiments of the present invention will be described below Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

Note that, in the drawings referenced below, a common reference numeral is assigned to members or sites producing the same effects, and duplicated descriptions are sometimes omitted or simplified. Further, the embodiments described in the drawings are schematized for clear illustration of the present invention, and do not represent the accurate sizes or reduction scales of an actual product.

As used herein, the term "PSA" refers to, as described earlier, a material that exists as a soft solid (a viscoelastic material) at a room temperature range, and possesses the property by which it easily adheres to an adherend by the application of pressure. The PSA in the art disclosed herein can be understood to be a solid content of a PSA composition or a constitutional component of a PSA layer.

As used herein, "a block copolymer of a monovinyl-substituted aromatic compound and a conjugated diene compound" refers to a polymer comprising at least one of each of a segment (hereinafter, referred to as "Segment A") which comprises a monovinyl-substituted aromatic compound as the primary monomer (which refers to a copolymer component in excess of 50 wt %; the same applies hereinafter), and a segment (hereinafter, referred to as "Segment B") which comprises a conjugated diene compound as a primary monomer. In general, the glass transition temperature of Segment A is higher than the glass transition temperature of Segment B. A typical constitution of such a polymer includes a triblock copolymer having a triblock structure (ABA structure triblock copolymer) having a Segment A (hard segment) at the respective ends of Segment B (soft segment), and a copolymer having a diblock structure (AB structure diblock copolymer) comprising one segment A and one segment B and the like.

As used herein, "styrene-based block copolymer" refers to a polymer comprising at least one styrene block. The styrene block refers to a segment comprising styrene as a primary monomer. The segment substantially consisting of only styrene is a typical example of such a styrene block. Further, a "styrene-isoprene block copolymer" refers to a polymer comprising at least one styrene block and at least one isoprene block (a segment comprising isoprene as a primary monomer). Typical examples of the styrene-isoprene block copolymer include a triblock copolymer having a triblock structure with a styrene block (hard segment) at the respective ends of the isoprene block (soft segment), a diblock copolymer having a diblock structure consisting of one isoprene block and one styrene block, and the like. The "styrene-butadiene block copolymer" refers to a polymer comprising at least one styrene block and at least one butadiene block (a segment comprising butadiene as a primary monomer).

As used herein, "the styrene content" of the styrene-based block copolymer refers to the mass fraction of the styrene component contained in the total mass of the block copolymer. The styrene content can be measured by NMR (nuclear magnetic resonance spectroscopy).

Further, the amount of the diblock copolymer (hereinafter, referred to as the "diblock copolymer fraction" or "diblock ratio") contained in the styrene-based block copolymer can be determined by the following method. That is, a styrene-based block copolymer is dissolved in tetrahydrofuran (THF), and subjected to high-performance liquid chromatography at a temperature of 40° C. with the THF as the mobile phase under the conditions of a flow rate of 1 m/min through four linearly connected columns consisting of two each of liquid chromatography columns GS5000H and G4000H both manufactured by Tosoh Corporation. The area of the peak corresponding to the diblock polymer is determined from the resulting chromatogram. Moreover, the diblock fraction is determined by calculating the percentage of the area of the peak corresponding to the diblock copolymer relative to the total area of all peaks.

As used herein, the term "weight" may be read as the term "mass". For example, the term "wt %" may be read as the term "% by mass", and the term "parts by weight" may be read as the term "parts by mass".

<PSA Composition>
(Block Copolymer of a Monovinyl-Substituted Aromatic Compound and a Conjugated Diene Compound)

The PSA composition described herein comprises a block copolymer of a monovinyl-substituted aromatic compound and a conjugated diene compound. The monovinyl-substituted aromatic compound refers to a compound in which a functional group having a vinyl group is bonded to an aromatic ring. Typical examples of the aromatic ring include a benzene ring (which can be a benzene ring substituted with a functional group (e.g., an alkyl group) containing no vinyl groups). Specific examples of the monovinyl-substituted aromatic compound include styrene, α-methylstyrene, vinyl toluene, vinyl xylene, and the like. Specific examples of the conjugated diene compound include 1,3-butadiene, isoprene, and the like. This kind of block copolymer may be used alone, or two or more species may be used in combination.

Note that, the block copolymer of the monovinyl-substituted aromatic compound and the conjugated diene compound are components which can be used as the base polymer of a PSA. The "base polymer" of a PSA refers to the primary component among rubbery polymers (polymers which exhibit rubber elasticity at a temperature range in the vicinity of room temperature) contained in the PSA (i.e., a component accounting for more than 50% by mass of all rubbery polymers).

Segment A (hard segment) in the block copolymer preferably has a copolymerization ratio of the monovinyl-substituted aromatic compound (two or more species can be used together) of 70 wt % or greater (more preferably 90 wt % or greater, or may even be substantially 100 wt %). Segment B (soft segment) in the block copolymer preferably has a copolymerization ratio of the conjugated diene compound (two or more species can be used together) of 70 wt % or greater (more preferably 90 wt % or greater, or may even be substantially 100 wt %). According to such a block copolymer, a PSA sheet having a higher performance can be realized.

The block copolymer may be a diblock copolymer, a triblock copolymer, a radial copolymer, a mixture thereof, or the like. In a triblock copolymer or a radial copolymer, Segment A (for example, a styrene block) is preferably placed at an end of the polymer chain. Segment A placed at the end of a polymer chain is likely to aggregate to form a domain, whereby pseudo crosslinks are formed, resulting in improved cohesive property of the PSA.

From the viewpoint of the adhesive strength (peel strength) to an adherend, the block copolymer in the art disclosed herein preferably has a diblock copolymer fraction of 30 wt % or greater (more preferably 40 wt % or greater, even more preferably 50 wt % or greater, especially preferably 60 wt % or greater, and typically 65 wt % or greater). From the viewpoint of the peel strength, a block copolymer in which the diblock copolymer fraction is 70 wt % or greater is particularly preferred. Further, from the viewpoint of the cohesive property and the like, a block copolymer in which the diblock copolymer fraction is 90 wt % or less (more preferably 85 wt % or less, for example, 80 wt % or less) is preferably used. For example, the block copolymer in which the diblock copolymer fraction is 60 to 85 wt % is preferable, and 70 to 85 wt % (for example, 70 to 80 wt %) is more preferable.

(Styrene-Based Block Copolymer)

In some embodiments, the block copolymer is a styrene-based block copolymer. For example, the block copolymer preferably contains at least one of a styrene-isoprene block copolymer and a styrene-butadiene block copolymer. The styrene-based block copolymer may include a hydride of which at least a part is hydrogenated (addition of a hydrogen atom). The styrene-based block copolymer can be used alone, or two or more species can be used together. Among the styrene-based block copolymers contained in the PSA, the amount of the styrene-isoprene block copolymer is preferably 70 wt % or greater, or the amount of the styrene-butadiene block copolymer is preferably 70 wt % or greater, or the combined amount of the styrene-isoprene block copolymer and the styrene-butadiene block copolymer is preferably 70 wt % or greater. In some preferable embodiments, essentially all (for example, 95 to 100 wt %) of the styrene-based block copolymer is the styrene-isoprene block copolymer. In another preferable embodiment, essentially all (for example, 95 to 100 wt %) of the styrene-based block copolymer is the styrene-butadiene block copolymer. According to such compositions, greater effects may be exhibited by applying the art disclosed herein.

The styrene-based block copolymer can be a diblock copolymer, a triblock copolymer, a radial copolymer, a mixture thereof, or the like. In a triblock copolymer and a radial copolymer, a styrene block is preferably placed at an end of the polymer chain. The styrene block placed at the end of a polymer chain is likely to aggregate to form a styrene domain, whereby pseudo crosslinks are formed, resulting in an improved cohesive property of the PSA. From the viewpoint of the adhesive strength (peel strength) to an adherend, the styrene-based block copolymer in the art disclosed herein preferably has a diblock copolymer fraction of 30 wt % or greater (more preferably 40 wt % or greater, even more preferably 50 wt % or greater, especially preferably 60 wt % or greater, and typically 65 wt % or greater). The styrene-based block copolymer may even have a diblock copolymer fraction of 70 wt % or greater (for example, 75 wt % or greater). Further, from the viewpoint of the cohesive property, etc., the styrene-based block copolymer preferably has a diblock copolymer fraction of 90 wt % or lower (more preferably 85 wt % or lower, for example, 80 wt % or lower). From the viewpoint of obtaining a good balance of both of the rough surface adhesion and the cohesive strength at a high temperature by applying the art disclosed herein, the styrene-based block copolymer preferably has a diblock copolymer fraction of 60 to 85 wt %, and more preferably 70 to 85 wt % (for example, 70 to 80 wt %).

The styrene content of the styrene-based block copolymer can be, for example, 5 to 40 wt %. From the viewpoint of the cohesive property, usually, a styrene-based block copolymer in which the styrene content is 10 wt % or greater (more preferably in excess of 10 wt %, for example, 12 wt % or greater) is preferable. Further, from the viewpoint of the peel strength, the styrene content is preferably 35 wt % or lower (typically, 30 wt % or lower, and more preferably 25 wt % or lower), and 22 wt % or lower (typically, less than 20 wt %, for example, 18 wt % or lower) is particularly preferable. From the viewpoint of further demonstrating the effect (effect which obtains both the rough surface adhesion and the cohesive strength at a high temperature) by applying the art disclosed herein, the styrene-based block copolymer in which the styrene content is 10 to 22 wt % can be preferably used.

(Tackifier Resin)

The PSA composition disclosed herein comprises a tackifier resin in addition to the block copolymer. The tackifier resin can be used alone, or two or more species can be used together. The tackifier resin is not specifically limited, and for example, both petroleum-based tackifier resins and natural product-based tackifier resins can be used. Here, the petroleum-based tackifier resin is a compound derived from a petroleum resource, has a chemical structure derived from a petroleum resource, and imparts adhesive properties due to the compatibility with adhesives and chemical properties based on the chemical structure thereof. Further, a natural product-based tackifier resin is a compound containing components derived from natural products, has a chemical structure derived from natural products, and imparts adhesive properties due to the compatibility with adhesives and chemical properties based on the chemical structure thereof. In the art disclosed herein, one or two or more species of these tackifier resins are suitably selected based on the chemical structures of the petroleum-based tackifier resin and the natural product-based tackifier resin to design a PSA having a good balance of the rough surface adhesion, the cohesive strength at a high temperature, and the preservability.

Examples of the petroleum-based tackifier resin include aliphatic (C5-based) petroleum resins, aromatic (C9-based) petroleum resins, aliphatic/aromatic copolymer (C5/C9-based) petroleum resins, styrene-based resins, hydrogenated products thereof (for example, alicyclic-based petroleum resins obtainable by hydrogenating aromatic petroleum resins) and the like. Other examples of the petroleum-based tackifier resin include coumarone-indene resin and dicyclopentadiene resin. For the petroleum-based tackifier resin, one species can be used alone, or two or more species can be used together.

Examples of the styrene-based resin include a resin comprising a styrene homopolymer as a primary component, a resin comprising an α-methylstyrene homopolymer as a primary component, a resin comprising a vinyltoluene homopolymer as a primary component, a resin comprising as a primary component a copolymer having a monomer composition that includes two or more species among styrene, α-methylstyrene and vinyltoluene (for example, an α-methylstyrene/styrene copolymer resin comprising an α-methylstyrene/styrene copolymer as a primary component) and the like.

A resin comprising coumarone and indene as monomers constituting the backbone (main chain) of the resin can be used as the coumarone-indene resin. Styrene, α-methylstyrene, methylindene, vinyl toluene, and the like are exemplified as examples of monomer components that can be contained in the resin backbone other than coumarone and indene.

Examples of the natural product-based tackifier resin include terpene resins, rosin-based resins, and the like. Terpene resins include unmodified terpene resins and modified terpene resins. Rosin-based resins include rosin-derived resins. The natural product-based tackifier resins can be used alone, or two or more species can be used together.

Examples of the terpene resin (unmodified terpene resin) include α-pinene polymer, β-pinene polymer, dipentene polymer, and the like. Examples of the modified terpene resin include those obtainable from these terpene resins via modifications (phenol modification, aromatic modification (e.g., styrene modification), hydrogenation, hydrocarbon modification, or the like). Specific examples include terpene phenol resins, aromatic modified (for example, styrene-modified) terpene resins, hydrogenated terpene resins, and the like. The terpene phenol resin may include hydrogenated terpene phenol resin.

The "terpene phenol resin" refers to a polymer containing a terpene residue and a phenol residue, and is a concept encompassing both of a copolymer of a terpene and a phenol compound (terpene phenol copolymer resin), and a phenol-modification product (phenol modified terpene resin) of a terpene homopolymer or copolymer (a terpene resin, and typically, an unmodified terpene resin).

Specific examples of the rosin-based resin include unmodified rosins (raw rosins) such as gum rosin, wood rosin, tall-oil rosin, etc.; modified rosins obtainable from these unmodified rosins via a modification such as hydrogenation, disproportionation, polymerization, etc. (hydrogenated rosins, disproportionated rosins, polymerized rosins, other chemically-modified rosins, etc.); and the like. Further, examples of rosin-derived resins include rosin esters such as unmodified rosins esterified with an alcohol (i.e., esterification products of rosins) and modified rosins (hydrogenated rosins, disproportionated rosins, polymerized rosins, etc.) esterified with an alcohol (i.e., esterification products of modified rosins), and the like; unsaturated fatty-acid-modified rosins obtainable from an unmodified rosin or a modified rosin (hydrogenated rosins, disproportionated rosins, polymerized rosins, etc.) via modifications with an unsaturated fatty acid; an unsaturated fatty-acid-modified rosin ester obtainable from a rosin ester via modifications with an unsaturated fatty acid; a rosin alcohol obtainable via reduction of a carboxyl group from an unmodified rosin, modified rosin (hydrogenated rosins, disproportionated rosins, polymerized rosin, etc.), an unsaturated fatty-acid-modified rosin or an unsaturated fatty-acid-modified rosin ester; metal salts of rosins including unmodified rosins, modified rosins, various rosin derivatives, etc. (in particular, rosin esters); rosin phenol resins obtainable from a rosin (unmodified rosins, modified rosins, various rosin derivatives, etc.) via the addition of phenol in the presence of an acid catalyst followed by thermal polymerization; and so on.

The softening point of the tackifier resin used in the art disclosed herein is usually higher than 40° C., and may even be 60° C. or above. In some embodiments, the softening point of the tackifier resin is 80° C. or above (for example, in excess of 80° C.), and is preferably 100° C. or above (for example, in excess of 100° C.). The upper limit of the softening point of the tackifier resin is not specifically limited, and usually 200° C. or below is suitable, and from the viewpoint of the rough surface adhesion, etc., the softening point is preferably 180° C. or below, more preferably 170° C. or below (for example, 160° C. or below), and may even be 140° C. or below, and may be 120° C. or below.

As used herein, the softening point of the tackifier resin is defined as a value measured based on the softening point test method (ring and ball method) specified in JIS K5902 and JIS K2207. Specifically, a sample was quickly melted at the lowest possible temperature, and with caution to avoid bubble formation, the melted sample was poured into a ring to the top, with the ring being placed on top of a flat metal plate. After cooling, any portions of the sample which had risen above the plane including the upper rim of the ring were sliced off with a small knife that had been slightly heated. Then, a support (ring support) was placed in a glass container (heating bath) having a diameter of 85 mm or larger and a height of 127 mm or larger, and glycerin was poured therein to a depth of 90 mm or deeper. Then, a steel ball (9.5 mm diameter, weighing 3.5 g) and the ring filled with the sample were immersed in the glycerin while preventing the two from contacting each other, and the temperature of the glycerin was maintained at 20° C.±5° C. for 15 minutes. Then, the steel ball was then placed at the center of the surface of the sample in the ring, and this was placed on a prescribed location of the support. Then, while maintaining the distance between the ring top and the glycerin surface at 50 mm, a thermometer was placed so that the center of the mercury ball of the thermometer was as high as the center of the ring, and the container was heated evenly by setting a Bunsen burner flame used in the heating at the midpoint between the center and the rim of the bottom of the container. Note that, after the temperature reaches 40° C. from the start of heating, the rate of increase of the bath temperature must be kept at 5° C.±0.5° C. per minute. As the sample gradually softened, the temperature at which the sample flowed out of the ring and finally contacted the bottom plate was read as the softening point. Two or more measurements of the softening point were performed simultaneously, and the average value of these measurements was used.

(Natural Product-Based Tackifier Resin (A))

In some embodiments, a natural product-based tackifier resin (A) having a softening point in excess of 80° C., and containing no aromatic ring is used as the tackifier resin. The natural product-based tackifier resin having a softening point in excess of 80° C. with a molecular structure containing no aromatic ring is very compatible with the PSA containing the block copolymer, and the effect by the addition thereof can be suitably exhibited. By use of the natural product-based tackifier resin (A), for example, a sufficient cohesive strength at a high temperature can be easily obtained based on the softening point. Further, by use of a compound containing no aromatic ring, the rough surface adhesion tends to be easily obtained, and further, a good preservability is easily obtained.

Among the above-mentioned natural product-based tackifier resins, those having a softening point in excess of 80° C., and having a molecular structure containing no aromatic ring can be used as the natural product-based tackifier resin (A) without specific limitation. For example, terpene resins, modified terpene resins, rosin-based resins, rosin-derived resins and the like having a softening point in excess of 80° C. can be used. The natural product-based tackifier resin (A) can be used alone, or two or more species can be used together.

The softening point of the natural product-based tackifier resin (A) is greater than 80° C. From the viewpoint of the cohesive strength at a high temperature, the softening point of the natural product-based tackifier resin (A) is preferably 90° C. or above, more preferably 100° C. or above (for example, in excess of 100° C.), even more preferably 110° C. or above (for example, in excess of 110° C.), and 115° C. or above is particularly preferable. In some embodiments, the softening point of the natural product-based tackifier resin (A) may even be 120° C. or above, may be 140° C. or above, and may be 150° C. or above. The upper limit of the softening point of the natural product-based tackifier resin (A) is not specifically limited, and usually, 200° C. or below is suitable, and from the viewpoint of the rough surface adhesion, etc., is preferably 180° C. or below, more preferably 170° C. or below (for example, 160° C. or below), and may even be 140° C. or below, and may be 120° C. or below.

In some preferable embodiments, a terpene resin is used as the natural product-based tackifier resin (A). Terpene resins are very compatible with the PSA containing the block copolymer, and the effect by the addition thereof can be suitably exhibited. While not specifically limited, it is considered that the terpene resin is very compatible with the soft segment (a segment comprising a conjugated diene compound as a primary monomer) of the block copolymer, imparts a suitable cohesive strength to the soft segment based on the softening point thereof, and contributes to the improvement of the cohesive strength at a high temperature. For example, by use of a suitable amount of the terpene resin, a good balance of the rough surface adhesion and the cohesive strength at a high temperature can be obtained.

The softening point of the terpene resin is greater than 80° C., and other than that, is not specifically limited. From the viewpoint of the cohesive strength at a high temperature, the softening point of the terpene resin is preferably 90° C. or above, more preferably 95° C. or above, even more preferably 100° C. or above (for example, in excess of 100° C.), particularly preferably 110° C. or above (for example, in excess of 110° C.), and 115° C. or above is particularly preferable. Usually, an upper limit of the softening point of the terpene resin of 200° C. or below is suitable, and from the viewpoint of the rough surface adhesion, etc., is preferably 160° C. or below, more preferably 140° C. or below, and may even be 120° C. or below.

In an embodiment which uses a terpene resin as the natural product-based tackifier resin (A), the content of the terpene resin in the PSA composition may even be, for example, 1 part by weight or greater with respect to 100 parts by weight of the block copolymer, and may be 10 parts by weight or greater. In some preferable embodiments, from the viewpoint of effectively exhibiting the effect by the addition of the terpene resin, the content of the terpene resin is 20 parts by weight or greater with respect to 100 parts by weight of the block copolymer, and may even be 30 parts by weight or greater, may be 40 parts by weight or greater, and may be 50 parts by weight or greater. In some embodiments, a content of the terpene resin of less than 120 parts by weight with respect to 100 parts by weight of the block copolymer is suitable, and from the viewpoint of obtaining both the rough surface adhesion and the cohesive strength at a high temperature, is preferably 100 parts by weight or less, more preferably 80 parts by weight or less, and may even be 70 parts by weight or less, and may be 50 parts by weight or less.

While not specifically limited, in an embodiment which uses a terpene resin as the natural product-based tackifier resin (A), the amount of terpene resin relative to 1 part by weight of Segment B (a segment comprising a conjugated diene compound as a primary monomer) in the block copolymer is, for example, 0.1 part by weight or greater, preferably 0.2 part by weight or greater, may even be 0.4 part by weight or greater, may be 0.5 part by weight or greater, and may be 0.6 part by weight or greater. In some embodiments, it is suitable to make the amount of terpene resin relative to 1 part by weight of Segment B of the block copolymer to 1.5 parts by weight or less, and from the viewpoint of obtaining both the rough surface adhesion and the cohesive strength at a high temperature, the amount of terpene resin is preferably 1.2 parts by weight or less, more preferably 1 part by weight or less, and may even be 0.8 part by weight or less, and may be 0.6 part by weight or less. By setting the amount of the terpene resin in this range, the effect by the addition of the terpene resin can be efficiently exhibited based on the compatibilization with the soft segment of the terpene resin.

In some preferable embodiments, a rosin-based resin can be used as the natural product-based tackifier resin (A). Rosin-based resins are very compatible with the PSA containing the block copolymer, and the effect by the addition thereof can be suitably exhibited. While not specifically limited, it is considered that the rosin-based resin, usually having a high polarity region and a low polarity region in one molecule, is compatible with each segment (the hard segment and the soft segment) of the block copolymer. This contributes to obtaining both the rough surface adhesion and the cohesive strength at a high temperature based on the compatibilization which is different than the terpene resin. Further, the use of a rosin-based resin is advantageous in the point that the adhesion to polar adherends such as metals can improve.

The softening point of the rosin-based resin is greater than 80° C., and other than that, is not specifically limited. From the viewpoint of the cohesive strength at a high temperature, the softening point of the rosin-based resin is preferably 100° C. or above, more preferably 110° C. or above, even more preferably 130° C. or above, and 150° C. or above is particularly preferable. Usually, an upper limit of the softening point of the rosin-based resin of 200° C. or below is suitable, and from the viewpoint of the rough surface adhesion, etc., is preferably 180° C. or below, and may even be 170° C. or below.

In an embodiment which uses a rosin-based resin as the natural product-based tackifier resin (A), the content of the rosin-based resin in the PSA composition may even be, for example, 1 part by weight or greater with respect to 100 parts by weight of the block copolymer, and may be 10 parts by weight or greater. In some preferable embodiments, from the viewpoint of effectively exhibiting the effect by the addition of the rosin-based resin, the content of the rosin-based resin is 20 parts by weight or greater with respect to 100 parts by weight of the block copolymer, and may even be 30 parts by weight or greater, may be 40 parts by weight or greater, and may be 50 parts by weight or greater. In some embodiments, the content of the rosin-based resin is suitably made to 120 parts by weight or less with respect to 100 parts by weight of the block copolymer, and from the viewpoint of obtaining both the rough surface adhesion and the cohesive strength at a high temperature, is preferably 100 parts by weight or less, more preferably 80 parts by weight or less, and may even 70 parts by weight or less, may be 50 parts by weight or less, and may be 30 parts by weight or less.

In some preferable embodiments, the natural product-based tackifier resin (A) comprises the terpene resin as the tackifier resin (A1) and the rosin-based resin as the tackifier resin (A2). By use of a terpene resin in combination with a rosin-based resin as the tackifier resin (A), it is possible to even better obtain both of the rough surface adhesion and the cohesive strength at a high temperature. In an embodiment which uses the tackifier resin (A1) in combination with the tackifier resin (A2), the usage ratio thereof is not specifically limited. In some embodiments, the ratio (A1/A2) of the content of the tackifier resin (A1) relative to the content of the tackifier resin (A2) is, on the basis of weight, for example, 1/10 or greater, may even be 1/5 or greater, may be 1/3 or greater, may be 1/2 or greater, may be 2/3 or greater, and may be 1 or greater. The ratio (A1/A2) may be 10 or less, may be 5 or less, may be 3 or less, and may be 2 or less.

In an embodiment which uses a natural product-based tackifier resin (A), the content (when comprising two or more species, the total amount thereof) of the natural product-based tackifier resin (A) in the PSA composition is not specifically limited, and a suitable amount in order to realize the desired effect can be used. In some embodiments, the content of the natural product-based tackifier resin (A) is in excess of 30 parts by weight and less than 140 parts by weight with respect to 100 parts by weight of the block copolymer, and may even be 35 to 130 parts by weight. In some preferable embodiments, the content of the natural product-based tackifier resin (A) is 40 to 120 parts by weight with respect to 100 parts by weight of the block copolymer. It is possible to better improve the balance between the rough surface adhesion and the cohesive strength at a high temperature thereby. The content of the natural product-based tackifier resin (A) may even be 50 parts by weight or greater with respect to 100 parts by weight of the block copolymer, may be 70 parts by weight or greater, may be 90 parts by weight or greater, and may be 100 parts by weight or greater. Further, the content of the natural product-based tackifier resin (A) is preferably 110 parts by weight or less with respect to 100 parts by weight of the block copolymer, may even be 90 parts by weight or less, may be 80 parts by weight or less, and may be 60 parts by weight or less.

(Petroleum-Based Tackifier Resin (B))

In some embodiments, the tackifier resin comprises a petroleum-based tackifier resin (B) in which the softening point is in excess of 100° C. and contains an aromatic ring. Petroleum-based tackifier resins having a softening point in excess of 100° C. and comprising a molecular structure containing an aromatic ring are very compatible with the PSA containing the block copolymer, and the effect by the addition thereof can be suitably exhibited. By use of the petroleum-based tackifier resin (B), a sufficient cohesive strength at a high temperature can be easily obtained based on the structure of the aromatic ring and the softening point. While not specifically limited, the petroleum-based tackifier resin (B) contains an aromatic ring, and accordingly, is easily compatible with a domain (hereinafter, referred to as the "hard domain". For example, the styrene domain in a styrene-based block copolymer) formed with aggregated hard segments (a segment comprising a monovinyl-substituted aromatic compound as the primary monomer) of the block copolymer. By the petroleum-based tackifier resin (B) having a high softening point being compatible with the hard domain, the heat resistance of pseudo crosslinks due to the hard domain may improve, and is considered to contribute to the improvement of the cohesive strength at a high temperature of the PSA.

Among the above-mentioned petroleum-based tackifier resins, those having a softening point in excess of 100° C., and having a molecular structure containing an aromatic ring can be used without specific limitation as the petroleum-based tackifier resin (B). For example, aromatic (C9-based) petroleum resins, aliphatic/aromatic copolymer (C5/C9-based) petroleum resins, styrene-based resins, coumarone-indene resins and the like having a softening point in excess of 100° C. can be used. Among these, aromatic petroleum resins and styrene-based resins are preferable. The petroleum-based tackifier resin (B) can be used alone, or two or more species can be used together.

The softening point of the petroleum-based tackifier resin (B) is greater than 100° C. From the viewpoint of the cohesive strength at a high temperature, the softening point of the petroleum-based tackifier resin (B) is suitably 110° C. or above, is preferably 125° C. or above, more preferably 135° C. or above, and even more preferably 150° C. or above. The upper limit of the softening point of the petroleum-based tackifier resin (B) is not specifically limited, and usually 200° C. or below is suitable, and from the viewpoint of the rough surface adhesion, etc., is preferably 180° C. or below, more preferably 170° C. or below (for example, 160° C. or below), may even be 150° C. or below, and may be 140° C. or below.

In an embodiment which uses the petroleum-based tackifier resin (B), the content (when comprising two or more species, the total amount thereof) of the petroleum-based tackifier resin (B) in the PSA composition is not specifically limited, and a suitable amount in order to realize the desired effect can be used. In some embodiments, the content of the petroleum-based tackifier resin (B) is in excess of 0 parts by weight to less than 50 parts by weight with respect to 100 parts by weight of the block copolymer, and may be 1 to 45 parts by weight. In some preferable embodiments, the content of the petroleum tackifier resin (B) is 5 to 40 parts by weight with respect to 100 parts by weight of the block copolymer. It is possible to better improve the balance between the rough surface adhesion and the cohesive strength at a high temperature thereby. The content of the petroleum-based tackifier resin (B) may even be 10 parts by weight or greater with respect to 100 parts by weight of the block copolymer, may be 15 parts by weight or greater, may be 20 parts by weight or greater, may be 25 parts by weight or greater, and may even be 30 parts by weight or greater (for example, 35 parts by weight or greater). Further, from the viewpoint of the rough surface adhesion, the content of the petroleum-based tackifier resin (B) may be 35 parts by weight or less with respect to 100 parts by weight of the block copolymer, and may be 25 parts by weight or less.

While not specifically limited, in the embodiment which uses the petroleum-based tackifier resin (B), the amount of the petroleum-based tackifier resin (B) relative to 1 part by weight of Segment A (a segment comprising a monovinyl-substituted aromatic compound as a primary monomer, and in the embodiment in which the block copolymer is a styrene-based block copolymer, it corresponds to the styrene component) in the block copolymer is, for example, 0.3 part by weight or greater, may even be 0.6 part by weight or greater, may be 1 part by weight or greater, may be 1.3 parts by weight or greater, and may be 2 parts by weight or greater. In some embodiments, from the viewpoint of the rough surface adhesion, the amount of the petroleum-based tackifier resin (B) relative to 1 part by weight of Segment A (for example, the styrene component) of the block copolymer is suitably made to 2.7 parts by weight or less, may even be 2.4 parts by weight or less, may be 1.8 parts by weight or less, and may be 1.5 parts by weight or less. By setting the petroleum-based tackifier resin (B) amount to this range, the petroleum-based tackifier resin (B) is easily compatible with a domain (for example, the styrene domain in a styrene-based block copolymer) formed with the aggregated hard segment of the block copolymer, and the effect by the addition of the petroleum-based tackifier resin (B) can be efficiently exhibited.

In some preferable embodiments, the natural product-based tackifier resin (A) is used in combination with the petroleum-based tackifier resin (B) as the tackifier resin. By use of the natural product-based tackifier resin (A) in combination with the petroleum-based tackifier resin (B), taking advantage of the effect on the block copolymer based on the differences in the chemical structure of each tackifier resin, a PSA having both the adhesion to rough surface and the cohesive strength at a high temperature in addition to a good preservability is easily formed. In the embodiment which uses the natural product-based tackifier resin (A) in combination with the petroleum-based tackifier resin (B), the usage ratio thereof is not specifically limited. In some embodiments, the ratio (A/B) of the content of the natural product-based tackifier resin (A) relative to the content of the petroleum-based tackifier resin (B) is, on the basis of weight, for example, 1 or greater, may be 2 or greater, may even be 3 or greater, may be 4 or greater, may be 5 or greater, and may be 6 or greater. The ratio (A/B) may be 20 or less, may be 16 or less, may even be 12 or less, and may be 10 or less.

(Other Tackifier Resins)

The PSA composition may contain a tackifier resin different from the natural product-based tackifier resin (A) and the petroleum-based tackifier resin (B) as long as the effect of the present invention is not impaired. Examples of the tackifier resin different from the natural product-based tackifier resin (A) and the petroleum-based tackifier resin (B) include natural product-based tackifier resins in which the softening point is 80° C. or below, natural product-based tackifier resins containing an aromatic ring, petroleum-based tackifier resins in which the softening point is 100° C. or below, and petroleum-based tackifier resins containing no aromatic ring. Examples of the natural product-based tackifier resin containing an aromatic ring include aromatic modified terpene resin, terpene phenol resin, and rosin phenol resin. Further, examples of the petroleum-based tackifier resin containing no aromatic ring include aliphatic (C5-based) petroleum resins, alicyclic-based petroleum resins, and the like.

According to the art disclosed herein, a PSA having a good balance of the rough surface adhesion, the cohesive strength at a high temperature, and the preservability can be formed without having to use a tackifier resin other than the natural product-based tackifier resin (A) and the petroleum-based tackifier resin (B) (in other words, without it being an essential component). Therefore, it is possible to utilize a composition in which the amount of the tackifier resin different than the natural product-based tackifier resin (A) and the petroleum-based tackifier resin (B) is limited, and a composition which is substantially free of such a tackifier resin. For example, the content of the tackifier resin different than the natural product-based tackifier resin (A) and the petroleum-based tackifier resin (B) can be made to less than 30 wt % in the total amount of the tackifier resin contained in the PSA composition, may even be less than 10 wt %, may be less than 3 wt %, and may be less than 1 wt %. The art disclosed herein can be carried out with an embodiment in which the PSA composition is substantially free of the tackifier resin different than the natural product-based tackifier resin (A) and the petroleum-based tackifier resin (B).

Further, according to the art disclosed herein, both the rough surface adhesion and the cohesive strength at a high temperature can be obtained based on a tackifier resin other than a phenol-based tackifier resin and the amount thereof without having to use a phenol-based tackifier resin (for example, a terpene phenol resin). While the phenol-based tackifier resin may contribute to the improvement of the adhesive properties, it tends to be a factor which promotes the deterioration of the PSA. Therefore, being able to obtain both the rough surface adhesion and the cohesive strength at a high temperature without using the phenol-based tackifier resin as an essential component is also helpful for obtaining an excellent preservability. According to this kind of constitution, a PSA having the desired adhesive properties can be realized in a form having a long-term quality stability. From such a viewpoint, the content of the phenol-based tackifier resin can be made to less than 30 wt % in the total amount of the tackifier resin contained in the PSA composition, may even be less than 10 wt %, may be less than 3 wt %, and may be less than 1 wt %. The art disclosed herein can be carried out in an embodiment in which the PSA composition is substantially free of the phenol-based tackifier resin. Further, the content of phenol-based tackifier resin in the PSA composition is preferably less than 30 parts by weight with respect to 100 parts by weight of the block copolymer, more preferably less than 10 parts by weight, even more preferably less than 3 parts by weight, and less than 1 part by weight is particularly preferable. By limiting the amount of the phenol-based tackifier resin used as described above, a PSA having a good preservability and excellent quality stability such as the adhesive property can be preferably obtained. Note that, the phenol-based tackifier resin herein means a tackifier resin having a molecular structure containing a phenol skeleton, and is a concept encompassing terpene phenol resin, hydrogenated terpene phenol resin, phenol resin (alkylphenol resin, xylene-formaldehyde resin, and the like), rosin phenol resin and the like.

(Total Amount of Tackifier Resin)

The total amount of the tackifier resin in the PSA composition is not specifically limited, and a suitable amount can be used in order to realize the desired effect. In some embodiments, the total amount of the tackifier resin is in excess of 35 parts by weight to less than 180 parts by weight with respect to 100 parts by weight of the block copolymer, and may even be 45 to 170 parts by weight. In some preferable embodiments, the total amount of the tackifier resin is 60 to 160 parts by weight with respect to 100 parts by weight of the block copolymer. It is possible to better improve the balance between the rough surface adhesion and the cohesive strength at a high temperature thereby. The total amount of the tackifier resin may even be 80 parts by weight or greater with respect to 100 parts by weight of the block copolymer, may be 100 parts by weight or greater, and may be 110 parts by weight or greater. Further, the total amount of the tackifier resin is preferably 140 parts by weight or less with respect to 100 parts by weight of the block copolymer, and may even be 130 parts by weight or less, may be 120 parts by weight or less, and may be 110 parts by weight or less. In some embodiments, the total amount of the tackifier resin may even be less than 100 parts by weight with respect to 100 parts by weight of the block copolymer, may be less than 90 parts by weight, and may be less than 80 parts by weight. Even in the constitution in which the total amount of the tackifier resin was limited in the manner, the desired effect can be realized according to the art disclosed herein.

(Softening Agent)

The PSA composition disclosed herein preferably includes a softening agent. By including a softening agent in the PSA, the tight adhesiveness to the adherend can improve, and the rough surface adhesion can improve. For example, by including a softening agent in the composition having a high cohesive strength at a high temperature, a PSA which obtains both the rough surface adhesion and the cohesive strength at a high temperature is easily formed. Here, the softening agent in this description is a liquid or a viscous fluid at room temperature (for example, 25° C.), or is a material in which the softening point is 40° C. or below. The softening point can be measured by the same method as the method for measuring the softening point of the aforementioned tackifier resin.

The species of softening agent is not specifically limited, and may be appropriately selected in accordance with the PSA composition (the species of block copolymer and the tackifier resin) and the like. Examples of the softening agent include liquid rubbers such as polybutene and polyisoprene, and a process oil such as a paraffin-based oil or a naphthene-based oil. Further, liquid resins such as liquid terpene resin and liquid rosin-based resin may be used as the softening agent. Other examples of the softening agent include higher fatty acid esters such as stearic acid or palmitic acid, and fatty acid amides. Among these, a liquid terpene resin or a process oil are preferably used. The softening agent can be used alone, or two or more species can be used together.

The content of the softening agent in the PSA composition is not specifically limited, and a suitable amount in order to realize the desired effect can be used. In some embodiments, the content of the softening agent is in excess of 0 parts by weight to less than 50 parts by weight with respect to 100 parts by weight of the block copolymer, and may even be 1 to 45 parts by weight. In some preferable embodiments, the content of the softening agent is 5 to 40 parts by weight with respect to 100 parts by weight of the block copolymer. A PSA which better improves the balance between the rough surface adhesion and the cohesive strength at a high temperature is easily formed thereby. The content of the softening agent may even be 10 parts by weight or greater with respect to 100 parts by weight of the block copolymer, may be 15 parts by weight or greater, and may be 20 parts by weight or greater. Further, the content of the softening agent may even be 35 parts by weight or less with respect to 100 parts by weight of the block copolymer, and may be 30 parts by weight or less.

(Isocyanate Compound)

The PSA composition disclosed herein may further include an isocyanate compound. By the use of an isocyanate compound, the cohesive strength of the PSA can improve. A polyfunctional isocyanate (which refers to a compound having an average of two or more isocyanate groups per molecule, including a compound having an isocyanurate structure) can be preferably used as the isocyanate compound. One or two or more species selected from various isocyanate compounds (polyisocyanates) containing two or more isocyanate groups per molecule can be used as this kind of polyfunctional isocyanate. Examples of this kind of polyfunctional isocyanate include aliphatic polyisocyanates, alicyclic polyisocyanates, aromatic polyisocyanates, and the like.

When using an isocyanate compound, the amount is not specifically limited, but for example, the amount may be set in excess of 0 parts by weight to 10 parts by weight or less (typically, 0.01 to 10 parts by weight) with respect to 100 parts by weight of the block copolymer. Usually, the amount of the isocyanate compound is suitably made to 0.1 to 10 parts by weight with respect to 100 parts by weight of the block copolymer, and making to 0.1 to 5 parts by weight (typically, 0.3 to 3 parts by weight, for example, 0.5 to 1 part by weight) is preferable. Further, in some embodiments, the PSA composition may even be substantially free of the isocyanate compound. According to the art disclosed herein, the cohesive strength at a high temperature and the peeling property under a constant load can be improved without using an isocyanate compound. Note that, that the PSA composition does not substantially comprise any isocyanate compound means that the content of the isocyanate compound contained in the PSA composition is less than 0.1 wt % (for example, 0 to 0.05 wt %).

(Anti-Aging Agent)

The PSA composition disclosed herein may comprise an anti-aging agent in accordance with need. By use of an anti-aging agent, the quality stability of the PSA can improve. The anti-aging agent may be used alone, or two or more may be used in combination. Examples of the anti-aging agent include phosphorus-based antioxidants, phenol-based antioxidants (hindered phenol-based antioxidants and the like), hindered amine-based antioxidants, aromatic amine-based antioxidants, sulfur-based antioxidants, and the like. While not specifically limited, the amount of anti-aging agent contained in the PSA composition disclosed herein, may be made to, for example, about 20 parts by weight or less with respect to 100 parts by weight of the block copolymer, and usually, is suitably made to 10 parts by weight or less, and may be 5 parts by weight or less. Further, the amount of the anti-aging agent may be set to, for example 0.1 parts by weight or greater with respect to 100 parts by weight of the block copolymer, may be 0.5 parts by weight or greater, and may be 1 part by weight or greater.

(Other Components)

The PSA composition disclosed herein may comprise various additives which are generally used in the field of PSAs such as leveling agent, crosslinking agent, crosslinking co-agent, plasticizer, filler, colorant (pigment, dye, etc.), anti-static agent, ultraviolet light absorber, photostabilizing agent in accordance with need. With respect to these various additives, those heretofore known can be used with typical methods. Further, the PSA composition disclosed herein may comprise one or two or more species of rubbery polymer other than the block copolymer of a monovinyl-substituted aromatic compound and a conjugated diene compound as long as the effect of the present invention is not impaired. The art disclosed herein may be preferably carried out by the embodiment (for example, the embodiment in which the content is 0 to 1 part by weight per 100 parts by weight of the block copolymer) in which the PSA composition does not substantially comprise any rubbery polymer other than the block copolymer.

In some embodiments, the PSA composition may be a composition substantially free of any chelate compound. Here, the chelate compound refers to, for example, a chelate complex of an alkaline earth metal oxide and a resin (an alkyl phenol resin, etc.) having a functional group (hydroxyl group, methylol group, etc.) capable of coordinating the oxide. The art disclosed herein can be preferably carried out in an embodiment in which the PSA composition is essentially free of such a chelate compound, or in an embodiment in which the content ratio of the chelate compound is 1 wt % or lower. According to such an embodiment, the PSA sheet having an excellent adhesive strength can be further realized.

In some preferable embodiments, the PSA composition may be a composition in which the total amount of the block copolymer of a monovinyl-substituted aromatic compound and a conjugated diene compound, the tackifier resin, and the softening agent accounts for 90 wt % or greater of the total weight (i.e., the weight of the PSA layer constituted by this PSA) of the PSA. For example, an embodiment in which the total amount is 90 to 99.8 wt % (typically, for example, 95 to 99.5 wt %) of the total weight of the PSA can be preferably used.

The form of the PSA composition disclosed herein is not specifically limited, and may be, for example, a solvent-based PSA composition containing a PSA (an adhesive component) having components described above in an organic solvent, a PSA composition having a PSA dispersed in an aqueous medium (a water-dispersed PSA composition, typically, aqueous emulsion type), a hot-melt type PSA composition or the like. From the viewpoint of applicability and the latitude in the choice of a substrate, etc., a solvent-based or a water-dispersed PSA composition can be preferably used. From the viewpoint of obtaining even greater adhesive properties, a solvent-based PSA composition is particularly preferable. Further, the hot-melt type can be applied in a heat melted state substantially free of any organic solvent, and accordingly, is preferable from the viewpoint of the productivity and the environment load reduction.

The solvent-based PSA composition can, typically, be prepared as a solution containing the respective components described above in an organic solvent. The organic solvent can be appropriately selected from known or conventional organic solvents. For example, one or two or more species of organic solvents selected from aromatic compounds (typically aromatic hydrocarbons) such as toluene, xylene, etc.; acetic acid esters such as ethyl acetate, butyl acetate, etc.; aliphatic or alicyclic hydrocarbons such as hexane, cyclohexane, methyl cyclohexane, etc.; halogenated alkanes such as 1,2-dichloroethane, etc.; ketones such as methyl ethyl ketone, acetyl acetone, etc.; and the like can be used. While not specifically limited, usually, the solvent-based PSA composition is suitably prepared to have a non-volatile content (NV) of 30 to 65 wt % (for example, 40 to 55 wt %).

Various conventionally known methods can be used as the method for obtaining a PSA sheet from the PSA composition. For example, a method (direct method) where the PSA composition is directly provided (typically applied) to a substrate and allowed to dry to form a PSA layer can be preferably used. Further, a method (transfer method) where the PSA composition is provided to a releasable surface (e.g., a surface of a release liner, a release-treated back face of a support substrate, etc.) and allowed to dry to form a PSA layer on the surface, and the formed PSA layer is transferred to a substrate may be used.

The application of the PSA composition is performed using, for example, a known or commonly used coater such as gravure roll coater, reverse roll coater, kiss roll coater, dip roll coater, bar coater, knife coater, spray coater, or the like. From the viewpoint of facilitating the crosslinking reaction and increasing the production efficiency, the drying of the PSA composition is preferably performed by heating. Usually, for example, the drying temperature is preferably in the range of around 40° C. to 150° C. (typically 40° C. to 120° C., for example, 50° C. to 120° C., and furthermore, 70° C. to 100° C.). While the drying time is not specifically limited, it may be set to a few tens of seconds to a few minutes (for example, within about 5 minutes, preferably about 30 seconds to 2 minutes). Then, an additional drying step may be performed in accordance with need. While the PSA layer is typically formed continuously, it may be formed in a regular pattern of dots or stripes or a random pattern depending on the purpose or application.

(Thickness of PSA Layer)

While not specifically limited, it is suitable that the thickness of the PSA layer is about 4 µm or greater (for example, 20 µm or greater), and suitably about 150 µm or less (typically, 120 µm or less, for example, 100 µm or less). In some embodiments, the thickness of the PSA layer may be preferably 30 µm or greater, more preferably 40 µm or greater, and even more preferably 50 µm or greater (for example, 60 µm or greater). The PSA sheet having a PSA layer of such a thickness can exhibit excellent adhesive properties (typically, obtaining both the rough surface adhesion and the cohesive strength at a high temperature). In the case of a substrate-containing double-sided PSA sheet, the constitution may be such that a PSA layer having the thickness is provided on both faces of the substrate. The thickness of each PSA layer may be the same or may be different.

<Examples of Constitution of PSA Sheet>

The PSA sheet (which can be a long sheet such as tape, etc.) disclosed herein may have, for example, the form of a double-sided PSA sheet having the cross-sectional structure shown in FIG. 1. A double-sided PSA sheet 1 comprises a substrate (for example, a plastic film) 15, and a first PSA layer 11 and a second PSA layer 12 respectively supported by both faces of the substrate 15. More specifically, the first PSA layer 11 and the second PSA layer 12 are provided on a first face 15A and a second face 15B of the substrate 15, respectively, with both faces 15A and 15B being non-releasing. Prior to use (before being adhered to an adherend), as illustrated in FIG. 1, the double-sided PSA sheet 1 can be spirally wound along with a release liner 21 having a front face 21A and a back face 21B both of which are the release faces. In the double-sided PSA sheet 1 in such an embodiment, the surface (second adhesive face 12A) of the second PSA layer 12 is protected by the front face 21A of the release liner 21, and the surface (first adhesive face 11A) of the first PSA layer 11 is protected by the back face 21B of the release liner 21. Alternatively, the first adhesive face 11A and the second adhesive face 12A may be respectively protected by two separate release liners.

The art disclosed herein can be applied preferably to a substrate-containing double-sided PSA sheet as illustrated in FIG. 1, and can also be applied to a double-sided PSA sheet 2 without substrate (i.e., having no substrate) as illustrated in FIG. 2. Prior to use, the double-sided PSA sheet 2 can be in a form, for example, as illustrated in FIG. 2, in which the first adhesive face 11A and the second adhesive face 11B of the PSA layer 11 without a substrate are respectively protected by release liners 21 and 22 in which at least the surface (front face) of the PSA layer side is the release face. Alternatively, the double-sided PSA sheet 2 can be in a form in which the release liner 22 is omitted, the release liner 21 in which both sides are the release faces is used, and the release liner 21 overlaps with the PSA layer 11 and is wound spirally so that the back face of release liner 21 contacts and protects the second adhesive face 11B.

As illustrated in FIG. 3, the art disclosed herein can further be applied to a single-sided adhesive substrate-containing PSA sheet 3 comprising a substrate 15 and the PSA layer 11 supported by the first face (non-release face) 15A of the substrate. Prior to use, PSA sheet 3 can be in a form, for example, as illustrated in FIG. 3, which protects a surface (adhesive face) 11A of the PSA layer 11 with the release liner 21 having a release face at least on the surface (front face) of the PSA layer side. Alternatively, the substrate-containing PSA sheet 3 can be in a form in which the release liner 21 is omitted, the substrate 15 having second face 15B being the release face is used, and the substrate-containing PSA sheet 3 is wound so that the second face 15B of the substrate 15 contacts and protects the first adhesive face 11A <Substrate>

When the art disclosed herein is applied to a substrate-containing double-sided PSA sheet or substrate-containing single-sided PSA sheet, a suitable substrate can be appropriately selected and used according to the application of the PSA sheet and examples of the substrate include plastic films such as polypropylene films, ethylene-propylene copolymer films, polyester films, and polyvinyl chloride films; foam sheets made of foam such as polyurethane foam, polyethylene foam, and polychloroprene foam, etc.; woven fabrics and non-woven fabrics (meaning to include paper such as Washi, high-grade paper, etc.) of a single species or a blend, etc., of various species of fibrous substances (which can be natural fibers such as hemp, cotton, etc.; synthetic fibers such as polyester, vinylon, etc.; semi-synthetic fibers such as acetate, etc.; and the like); and metal foil such as aluminum foil and copper foil. The plastic film (typically, referring to a non-porous plastic film, which should be conceptually distinguished from a woven fabric and a non-woven fabric) may be a non-stretched film, or a stretched (uni-axially stretched or bi-axially stretched) film. Further, the substrate surface to be provided with a PSA layer may have been subjected to a surface treatment such as primer coating or corona discharge treatment.

Examples of the non-woven fabric utilized for the substrate include non-woven fabrics constituted with natural fibers including pulp such as wood pulp and the like, cotton, hemp, etc.; non-woven fabrics constituted with chemical fibers (synthetic fibers) including polyester fibers such as polyethylene terephthalate (PET) fibers, etc., rayon, vinylon, acetate fibers, polyvinyl alcohol (PVA) fibers, polyamide fibers, polyolefin fibers, polyurethane fibers, etc.; non-woven fabrics constituted with two or more materially different species of fibers used together; and the like. Among these, from the viewpoint of the impregnating ability and the repulsion resistance of the PSA, non-woven fabrics constituted with pulp or hemp (for example, hemp pulp) and non-woven fabrics constituted with PET fibers are preferable. The use of a non-woven fabric substrate also contributes to the improvement of the flexibility or hand-tearability of the PSA sheet.

A preferable non-woven fabric (non-woven fabric substrate) may have a grammage of about 30 g/m$^2$ or less (for example, 25 g/m$^2$ or less, and typically, 20 g/m$^2$ or less). A non-woven fabric having such a grammage is suitable for fabrication of a lightweight PSA sheet having excellent adhesive properties. From the viewpoint of the repulsion resistance, a non-woven fabric having a grammage less than 18 g/m$^2$ (for example, 16 g/m$^2$ or less, typically, 15 g/m$^2$ or less) is preferable. From the viewpoint of improving the strength of the substrate itself, the grammage is preferably 10 g/m$^2$ or greater (for example, 12 g/m$^2$ or greater, and typically, 13 g/m$^2$ or greater).

The bulk density (may be calculated by dividing the grammage by the thickness) of the non-woven fabric substrate is suitably about 0.20 g/cm$^3$ or greater, and preferably 0.25 g/cm$^3$ or greater (for example, 0.30 g/cm$^3$ or greater), more suitably about 0.50 g/cm$^3$ or less, and preferably 0.40 g/cm$^3$ or less (for example, 0.35 g/cm$^3$ or less). By the bulk density being within this range, the substrate itself will have a suitable strength, and a good PSA impregnating ability can be obtained. From the viewpoint of the repulsion resistance, the use of a non-woven fabric substrate having a bulk density in the range of 0.25 to 0.40 g/cm$^3$ (for example, 0.30 to 0.35 g/cm$^3$) is particularly preferable.

The non-woven fabric substrate may comprise, in addition to the constituent fibers described above, a resin component such as starch (for example, cationized starch), polyacrylamide, viscose, polyvinyl alcohol, urea formaldehyde resin, melamine formaldehyde resin, polyamide polyamine epichlorohydrin resin, or the like. The resin component may function as a paper strengthening agent for the non-woven fabric substrate. By use of such a resin component in accordance with need, the strength of the non-woven fabric substrate can be adjusted. The non-woven fabric substrate may comprise, in accordance with need, additives generally used in the fields related to production of non-woven fabrics, such as yield-increasing agents, drainage-aiding agents, viscosity-adjusting agents, dispersants, and the like.

While the thickness of the substrate can be appropriately selected in accordance with the purpose, generally, the thickness is suitably made to about 2 μm or larger (typically, 10 μm or larger), and, 500 μm or smaller (typically, 200 μm or smaller) is preferable. When using a non-woven fabric as the substrate, the thickness of the non-woven fabric substrate is suitably about 150 μm or smaller. From the viewpoint of sufficiently impregnating the entire substrate with PSA, the thickness is preferably 100 μm or smaller (for example, 70 μm or smaller). Further, with reference to the handling during fabrication of the PSA sheet, the thickness is preferably 10 μm or larger (for example, 25 μm or larger). From the viewpoint of the repulsion resistance, the thickness is preferably 30 μm or larger (for example, 35 μm or larger, and typically 40 μm or larger), and is more preferably 60 μm or smaller (for example, 50 μm or smaller, and typically, 45 μm or smaller).

<Thickness of PSA Sheet>

The overall thickness (including the thickness of the PSA layer and the substrate, but not including the thickness of the release liner) of the PSA sheet disclosed herein is not specifically limited, and, from the viewpoint of making the PSA sheet thinner, lighter and resource-saving, is preferably about 1000 μm or less (for example, 500 μm or less, and typically, 300 μm or less) and may even be 150 μm or less. Further, from the viewpoint of ensuring good adhesive properties, the thickness is suitably 50 μm or greater (for example, 70 μm or greater, and typically, 100 μm or greater).

<Release Liner>

There are no limitations to the release liner, and any conventional release paper or the like can be used. For example, a release liner having a release layer on a surface of a substrate such as a plastic film or a sheet of paper, etc.; a release liner formed from a poorly-adhesive material such as a fluorine-based polymer (polytetrafluoroethylene, etc.) or a polyolefin-based resin (polyethylene, polypropylene, etc.); or the like can be used. The release layer can be formed, for example, by processing the surface of the substrate with a silicone-based, a long-chain alkyl-based, a fluorine-based, a molybdenum sulfide-based release agent or the like.

<Properties of PSA Sheet>

The PSA sheet disclosed herein preferably has an adhesive strength (to-foam adhesive strength) to a soft urethane foam measured in an environment of 23° C. and 50% RH under the conditions of a tensile speed of 300 mm/min and a peel angle of 180 degrees of 3 N/10 mm or greater. The foam surface is a rough surface, and accordingly, the PSA sheet having such a to-foam adhesive strength can exhibit sufficient adhesiveness to rough surfaces. From the viewpoint of the rough surface adhesion, the to-foam adhesive strength is preferably 4 N/10 mm or greater, more preferably 5 N/10 mm or greater, and 6 N/10 mm or greater is particularly preferable. Note that, the upper limit of the to-foam adhesive strength is not specifically limited, and may even be, for example, around 10 N/10 mm or less. The PSA sheet was pressure bonded to the surface of the soft urethane foam as the adherend with a 2 kg roller moved back and forth once, left standing for 30 minutes, and subsequently, the to-foam adhesive strength was measured under the conditions of a tensile speed of 300 mm/min and a peel angle of 180 degrees according to JIS Z0237. Color Foam (trade name "ECS" (gray)) manufactured by Inoac Corporation or its equivalent can be used as the adherend (soft urethane foam). The soft urethane foam (trade name "ECS" (gray)) is a polyether urethane foam having a density of 22±2 kg/m$^3$ and a hardness (according to Method D specified in JIS K 6400-2(2004)) of 107.9±22.6 N. More specifically, the to-foam adhesive strength is measured by the method described later in the examples.

The PSA sheet disclosed herein preferably does not fall off in a cohesive strength test on the stainless steel plate measured under the conditions of a temperature of 70° C., an adhered area of 10 mm×30 mm, a load of 500 g, and a holding time of 1 hour. The PSA sheet satisfying such properties has an excellent cohesive strength at a high temperature, and even when used in an embodiment exposed to high temperature conditions, peeling and displacement are unlikely to occur, and an excellent adhesive reliability is easily realized. The PSA sheet according to some embodiments preferably has a displacement distance from the initial position in the cohesive strength test of 3 mm or less, more preferably 2 mm or less, and even more preferably 1.5 mm or less. The cohesive strength test is specifically carried out by a method described later in the examples.

In some embodiments, the PSA sheet preferably has a peeling distance of 5 mm or less in the constant load peeling test measured by the method described later in the examples both in the initial and after the aging test. The PSA sheet satisfying such properties has sufficient resistance to continuous peeling loads, even when stored over a long period of time, and accordingly, can realize an attachment and fastening having a high adhesive reliability. The peeling distance in the constant load peeling test is more preferably 3 mm or less, even more preferably 2 mm or less, and especially preferably 1 mm or less (for example, 0.5 mm or less).

Further, the PSA sheet disclosed herein preferably has a decreasing rate (decreasing rate after the aging test) of the peeling property under a constant load after the aging test of 50% or less obtained from the method described later in the examples. The PSA sheet satisfying such properties has excellent long-term quality stability and has sufficient preservability. The PSA sheet disclosed herein particularly preferably has a decreasing rate after the aging test of 20% or less.

<Applications>

The PSA compositions or the PSA sheets disclosed herein are useful in joining components (for example, fastening applications for various components in such products) to each other in various OA equipment (for example, PC), home appliances (for example, rice cookers and refrigerators), automobiles, and building materials (for example, home construction materials).

EXAMPLES

Several examples relating to the present invention are described below, but the present invention is not intended to be limited to these examples. Note that, in the description below, "parts" and "%" are based on the mass unless otherwise specified. Further, unless otherwise specified, descriptions such as the amount of each material are based on an amount that does not take solvent into consideration.

Example 1

(Preparation of PSA Composition)

100 parts of styrene-isoprene block copolymer (product name "Quintac 3520 manufactured by Zeon Corporation, styrene content 15%, diblock copolymer fraction 78%), 60 parts of terpene resin (product name "YS RESIN PX1150N" manufactured by Yasuhara Chemical Co., Ltd.) as the natural product-based tackifier resin (A1), 20 parts of rosin-based resin (product name "PENSEL D160" manufactured by Arakawa Chemical Industries, Ltd.) as the natural product-based tackifier resin (A2), 5 parts of styrene-based resin (product name "SA140" manufactured by Kraton Corporation) as the petroleum-based tackifier resin (B), 10 parts of liquid terpene resin (product name "YS RESIN PX300N" manufactured by Yasuhara Chemical Co., Ltd.) as the softening agent (C), and 3 parts of the anti-aging agent were stirred and mixed with toluene as the solvent to prepare a PSA composition having an NV of 50%. A product named "IRGANOX CB612" manufactured by BASF Corporation (blend obtained by blending a product name "IRGAFOS 168" manufactured by BASF Corporation and a product named "IRGANOX 565" manufactured by BASF Corporation at a ratio of 2:1) were used as the anti-aging agent.

(Fabrication of PSA Sheet)

The PSA composition was applied to the treated release face of a 75 μm-thick PET film that had been treated with a silicone-based release agent, and dried at 120° C. for 3 minutes to form a PSA layer having a thickness of 70 μm. To the PSA layer surface was adhered a release liner treated with a silicone-based release agent. The PSA sheet (release liner-containing double-sided PSA sheet without substrate) according to this example was thus fabricated.

Examples 2 to 10 and Comparative Examples 1 to 12

Other than modifying the species and amount of the tackifier resin and the species and amount of the softening agent as illustrated in Tables 1 and 2, the PSA composition according to each example was prepared in the same manner as Example 1, and each PSA composition was used to fabricate the PSA sheet according to each example in the same manner as Example 1.

Note that, the materials used in the tables are as follows.
(Natural Product-Based Tackifier Resin Containing No Aromatic Ring)
"PX1150N": product name "YS RESIN PX1150N" manufactured by Yasuhara Chemical Co., Ltd., terpene resin having a softening point of 115° C.
"PX1000": product name "YS RESIN PX1000" manufactured by Yasuhara Chemical Co., Ltd., terpene resin having a softening point of 100° C.
"PX800": product name "YS RESIN PX800" manufactured by Yasuhara Chemical Co., Ltd., terpene resin having a softening point of 80° C.
"D160": product name "PENSEL D160" manufactured by Arakawa Chemical Industries, Ltd., rosin-based resin having a softening point of 157° C.
"A115": product name "SUPER ESTER A115" manufactured by Arakawa Chemical Industries, Ltd., rosin-based resin having a softening point of 120° C.
"A75": product name "SUPER ESTER A75" manufactured by Arakawa Chemical Industries, Ltd., rosin-based resin having a softening point of 80° C.
(Petroleum-based Tackifier Resins Having Aromatic Ring)
"SA140": product name "SA140" manufactured by Kraton Corporation, styrene-based resin having a softening point of 137° C.
"Kristalex 5140": product name "Kristalex 5140" manufactured by Eastman Chemical Company, aromatic petroleum resin having a softening point of 140° C.
"NEOPOLYMER 150": product name "NISSEKI NEOPOLYMER 150" manufactured by JXTG Nippon Oil & Energy Corporation, aromatic petroleum resin having a softening point of 155° C.
"FTR2120": product name "FTR2120" manufactured by Mitsui Chemicals, Inc., aromatic petroleum resin having a softening point of 125° C.
"SX100": product name "YS RESIN SX100" manufactured by Yasuhara Chemical Co., Ltd., styrene-based resin having a softening point of 100° C.
(Natural Product-Based Tackifier Resins Having Aromatic Ring)
"T145": product name "YS POLYSTAR-T145" manufactured by Yasuhara Chemical Co., Ltd., terpene phenol resin having a softening point of 145° C.
"TO105": product name "YS RESIN TO105" manufactured by Yasuhara Chemical Co., Ltd., aromatic modified terpene resin having a softening point of 100° C.
(Alicyclic/Aliphatic Petroleum Resins)
"M100": product name "ARKON M100" manufactured by Arakawa Chemical Industries, Ltd., alicyclic-based petroleum resin having a softening point of 100° C.
"P100": product name "ARKON P100" manufactured by Arakawa Chemical Industries, Ltd., aliphatic petroleum resin having a softening point of 100° C.
(Softening Agent)
"PX300N": product name "YS RESIN PX300N" manufactured by Yasuhara Chemical Co., Ltd., liquid terpene resin having a softening point of 30° C.
"PW-90": product name "Diana Process Oil PW-90" manufactured by Idemitsu Kosan Co., Ltd., paraffin-based oil <Evaluation Methods>
(To-Foam Adhesive Strength)

The release liner covering one of the adhesive faces of the PSA sheet (double-sided PSA sheet) was removed, and a 50 μm thick PET film was adhered as a backing. The backed PSA sheet was cut to a 10 mm width by 100 mm length to prepare a measurement sample. A soft urethane foam (Color Foam (trade name "ECS" (gray)) manufactured by Inoac Corporation) having a thickness of 10 mm was cut to 30 mm width by 100 mm length to prepare as an adherend. The other adhesive face (measurement target face) of the test piece was exposed in an environment of 23° C. and 50% RH and the exposed adhesive face of the test piece was pressure bonded to the surface of the adherend with a 2 kg roller moved back and forth once. After being left standing for 30 minutes in the same environment, a tensile testing machine was used to peel the test piece under the conditions of a tensile speed of 300 mm/min and a peel angle of 180 degrees according to JIS Z0237 to measure the adhesive strength (to-foam adhesive strength) [N/10 mm]. If the to-foam adhesive strength was 3.0 N/10 mm or greater, it was judged to have a sufficient rough surface adhesion.

Note that, when measuring a single-sided PSA sheet as the test piece, the backing of the PET film is not required.

(70° C. Cohesive Strength)

The release liner covering one of the adhesive faces of the PSA sheet (double-sided PSA sheet) was removed, and a 50 μm thick PET film was adhered as a backing. The backed PSA sheet was cut to 10 mm wide stripes to prepare a test piece. The other adhesive face (measurement target face) of the test piece was exposed in an environment of 23° C. and 50% RH, and the exposed adhesive face of the test piece was press-bonded over a 10 mm width by 30 mm length adhered area to the stainless steel (SUS304) plate as the adherend with a 2 kg roller moved back and forth once. The test piece thus bonded on the adherend was left standing in the same environment for 30 minutes. Subsequently, the adherend was vertically suspended with the length direction of the test piece being in the vertical direction. A 500 g load was applied to the free end of the test piece, and was left standing in an environment at 70° C. for one hour with the load applied in accordance with JIS Z0237. The distance (displacement distance) [mm] that the left standing test piece was displaced from the initial adhered position was measured. Three test strips were used per PSA sheet for the measurement (i.e., n=3), and the arithmetic average of the displacement distance [mm] according to these test pieces was denoted as the "70° C. cohesive strength". If even one test piece fell off, it was indicated as a "fall off". When there was no fall off in one hour in the 70° C. cohesive strength test, the test piece was judged to have a sufficient cohesive strength at a high temperature.

Note that, when measuring a single-sided PSA sheet as the test piece, the backing of the PET film is not required.

(Constant Load Peeling Test)

With reference to FIG. 4, one adhesive face 5A of the PSA sheet (double-sided PSA sheet) 5 prior to (initial) the following aging test and after the aging test was adhered to a 75 μm thick PET film 52 as a backing. The backed PSA sheet 5 was cut to a 10 mm width by 100 mm length to prepare a test piece 54. The other adhesive face 5B of the test piece 54 was press-bonded to the surface of an adherend 56 in an environment of 23° C. and 50% RH with a 2 kg roller moved back and forth once. The test piece was left standing in the same environment for 30 minutes. A stainless steel (SUS304) plate was used as the adherend. Then, as illustrated in FIG. 4, the adherend 56 was maintained horizontally in an environment of 23° C. and 50% RH so that the face to which the test piece 54 is adhered faced downwards. A load 58 of 100 g (1.0 N) was applied to the end of the test piece 54 so that the peel angle was 90 degrees, and the peeling distance [mm] after 24 hours was measured. Two test pieces were respectively used for the PSA sheet prior to the aging test (initial) and after the aging test (for the measurement i.e., n=2), and the arithmetic average of the peeling distance [mm] according to these test pieces was denoted as the evaluation result of the "constant load peeling". If even one test piece fell off, it was indicated as a "fall of".

Note that, when measuring a single-sided PSA sheet as the test piece, the backing of the PET film is not required.

(Aging Test)

The PSA sheet was cut into a rectangular shape having a length of 30 cm and a width of 20 cm together with a release liner covering the adhesive face to prepare a sample for the aging test. The samples were stored in a dryer maintained at 85° C. in an air atmosphere for 10 days. The samples were suspended in the dryer, and stored so as not to overlap with each other.

(Preservability)

The preservability was evaluated based on the peeling distance [mm] of the constant load peeling test measured for the PSA sheet before and after the aging test. Specifically, from the results of the constant load peeling test, the decreasing rate (decreasing rate after the aging test) of the peeling property under a constant load after the aging test was obtained by the formula:

decreasing rate after the aging test [%]=(the peeling distance after the aging test−the peeling distance prior to the aging test)/the peeling distance prior to the aging test×100.

If the decreasing rate after the aging test is 50% or less, it is judged to have a sufficient preservability. If the decreasing rate after the aging test is 20% or less, it is judged to have an excellent preservability.

A summary and the evaluation results of each example are illustrated in Tables 1 and 2.

TABLE 1

| | | | Example 1 | Example 2 | Example 3 | Example 4 | Example 5 | Example 6 |
|---|---|---|---|---|---|---|---|---|
| Styrene-based block copolymer [parts] | | | 100 | 100 | 100 | 100 | 100 | 100 |
| Tackifier resin [parts] | Terpene resin (A1) | PX1150N (Softening point 115° C.) | 60 | 60 | 20 | 60 | 40 | 40 |
| | | PX1000 (Softening point 100° C.) | — | — | — | — | — | — |
| | Rosin-based resin (A2) | D160 (Softening point 157° C.) | 20 | 20 | 20 | 60 | 40 | 40 |
| | | A115 (Softening point 120° C.) | — | — | — | — | — | — |
| | Total amount of tackifier resin (A) | | 80 | 80 | 40 | 120 | 80 | 80 |
| | Aromatic petroleum resin (B) | SA140 (Softening point 137° C.) | 5 | 40 | — | — | — | — |

TABLE 1-continued

|  |  |  |  |  |  |  |  |  |
|---|---|---|---|---|---|---|---|---|
|  |  | Kristalex 5140 (Softening point 140° C.) | — | — | 20 | 40 | — | — |
|  |  | Neopolymer 150 (Softening point 155° C.) | — | — | — | — | 20 | — |
|  |  | FTR 2120 (Softening point 125° C.) | — | — | — | — | — | 20 |
|  | Total amount of tackifier resin (B) |  | 5 | 40 | 20 | 40 | 20 | 20 |
|  | Total amount of tackifier resin |  | 85 | 120 | 60 | 160 | 100 | 100 |
| Softening agent [parts] | PX300N |  | 10 | — | 10 | 20 | — | — |
|  | PW-90 |  | — | 10 | — | — | 20 | 30 |
| To-foam adhesive strength [N/10 mm] |  |  | 6.0 | 3.6 | 5.0 | 3.5 | 3.7 | 4.1 |
| 70° C. cohesive strength [mm] |  |  | 1.9 | 1.2 | 1.7 | 1.5 | 1.8 | 2.3 |
| Constant load peeling | Initial [mm] |  | 1.4 | 0.4 | 1.3 | 0.5 | 1.1 | 0.4 |
|  | After aging test [mm] |  | 1.8 | 0.45 | 1.8 | 0.6 | 1.5 | 0.45 |
| Preservability (decreasing rate after aging test) [%] |  |  | 28.6 | 12.5 | 38.5 | 20.0 | 36.4 | 12.5 |

|  |  |  | Example 7 | Example 8 | Example 9 | Example 10 |
|---|---|---|---|---|---|---|
| Styrene-based block copolymer [parts] |  |  | 100 | 100 | 100 | 100 |
| Tackifier resin [parts] | Terpene resin (A1) | PX1150N (Softening point 115° C.) | 60 | — | 60 | 60 |
|  |  | PX1000 (Softening point 100° C.) | — | 20 | — | — |
|  | Rosin-based resin (A2) | D160 (Softening point 157° C.) | — | 60 | 60 | 20 |
|  |  | A115 (Softening point 120° C.) | 40 | — | — | — |
|  | Total amount of tackifier resin (A) |  | 100 | 80 | 120 | 80 |
|  | Aromatic petroleum resin (B) | SA140 (Softening point 137° C.) | 20 | 20 | 40 | 10 |
|  |  | Kristalex 5140 (Softening point 140° C.) | — | — | — | — |
|  |  | Neopolymer 150 (Softening point 155° C.) | — | — | — | — |
|  |  | FTR 2120 (Softening point 125° C.) | — | — | — | — |
|  | Total amount of tackifier resin (B) |  | 20 | 20 | 40 | 10 |
|  | Total amount of tackifier resin |  | 120 | 100 | 160 | 90 |
| Softening agent [parts] | PX300N |  | 10 | 10 | 40 | 5 |
|  | PW-90 |  | — | — | — | — |
| To-foam adhesive strength [N/10 mm] |  |  | 5.6 | 3.8 | 6.5 | 3.1 |
| 70° C. cohesive strength [mm] |  |  | 2.2 | 2.5 | 2.8 | 0.8 |
| Constant load peeling | Initial [mm] |  | 0.9 | 1.5 | 3.0 | 0.9 |
|  | After aging test [mm] |  | 1.3 | 2.0 | 4.1 | 1.25 |
| Preservability (decreasing rate after aging test) [%] |  |  | 44.4 | 33.3 | 36.7 | 38.9 |

TABLE 2

|  |  |  | Comparative example 1 | Comparative example 2 | Comparative example 3 | Comparative example 4 | Comparative example 5 | Comparative example 6 | Comparative example 7 |
|---|---|---|---|---|---|---|---|---|---|
| Styrene-based block copolymer [parts] |  |  | 100 | 100 | 100 | 100 | 100 | 100 | 100 |
| Tackifier resin [parts] | Terpene resin | PX1150N (Softening point 115° C.) | 60 | 60 | — | — | 60 | — | — |
|  |  | PX800 (Softening point 80° C.) | — | — | — | 40 | — | 5 | — |

TABLE 2-continued

| | | | | | | | | |
|---|---|---|---|---|---|---|---|---|
| Rosin-based resin | D160 (Softening point 157° C.) | 20 | 20 | — | — | 20 | — | — |
| | A75 (Softening point 80° C.) | — | — | — | 40 | — | 60 | — |
| Total amount of tackifier resin (A) | | 80 | 80 | 0 | 0 | 80 | 0 | 0 |
| Aromatic petroleum resin | SA140 (Softening point 137° C.) | 40 | 40 | 20 | — | — | — | 60 |
| | Kristalex 5140 (Softening point 140° C.) | — | — | — | — | — | — | — |
| | Neopolymer 150 (Softening point 155° C.) | — | — | — | 20 | — | — | — |
| | SX100 (Softening point 100° C.) | — | — | — | — | 40 | — | — |
| Total amount of tackifier resin (B) | | 40 | 40 | 20 | 20 | 0 | 0 | 60 |
| Terpene phenol resin | T145 (Softening point 145° C.) | — | — | 40 | — | — | — | — |
| Aromatic modified terpene resin | TO105 (Softening point 100° C.) | — | — | — | — | — | 30 | — |
| Alicyclic petroleum resin | M100 (Softening point 100° C.) | — | — | — | — | — | — | 160 |
| Aliphatic petroleum resin | P100 (Softening point 100° C.) | — | — | — | — | — | — | — |
| Total amount of tackifier resin | | 120 | 120 | 60 | 100 | 120 | 35 | 220 |
| Softening agent [parts] | PX300N | — | 50 | 10 | — | — | — | — |
| | PW-90 | — | — | — | 20 | 10 | — | 80 |
| To-foam adhesive strength [N/10 mm] | | 0.3 | 4.6 | 2.0 | 4.4 | 3.4 | 0.2 | 7.1 |
| 70° C. cohesive strength [mm] | | 0.5 | Fell off | 0.9 | Fell off | Fell off | Fell off | Fell off |
| Constant load peeling | Initial [mm] | 0.6 | 2.3 | 0.6 | 1.5 | 0.9 | 1.0 | 1.2 |
| | After aging test [mm] | 0.8 | Fell off | Fell off | 2.0 | 1.1 | 1.4 | 1.6 |
| Preservability (decreasing rate after aging test) [%] | | 33.3 | — | — | 33.3 | 22.2 | 40.0 | 33.3 |

| | | | Comparative example 8 | Comparative example 9 | Comparative example 10 | Comparative example 11 | Comparative example 12 |
|---|---|---|---|---|---|---|---|
| Styrene-based block copolymer [parts] | | | 100 | 100 | 100 | 100 | 100 |
| Tackifier resin [parts] | Terpene resin | PX1150N (Softening point 115° C.) | — | 60 | 20 | 120 | 10 |
| | | PX800 (Softening point 80° C.) | — | — | — | — | — |
| | Rosin-based resin | D160 (Softening point 157° C.) | — | 60 | 20 | 20 | 20 |
| | | A75 (Softening point 80° C.) | — | — | — | — | — |
| | Total amount of tackifier resin (A) | | 0 | 120 | 40 | 140 | 30 |
| | Aromatic petroleum resin | SA140 (Softening point 137° C.) | — | — | — | 10 | 40 |
| | | Kristalex 5140 (Softening point 140° C.) | — | 60 | 50 | — | — |
| | | Neopolymer 150 (Softening point 155° C.) | — | — | — | — | — |

TABLE 2-continued

|  |  |  |  |  |  |  |
|---|---|---|---|---|---|---|
|  | SX100 (Softening point 100° C.) | — | — | — | — | — |
| Total amount of tackifier resin (B) |  | 0 | 60 | 50 | 10 | 40 |
| Terpene phenol resin | T145 (Softening point 145° C.) | — | — | — | — | — |
| Aromatic modified terpene resin | TO105 (Softening point 100° C.) | — | — | — | — | — |
| Alicyclic petroleum resin | M100 (Softening point 100° C.) | — | — | — | — | — |
| Aliphatic petroleum resin | P100 (Softening point 100° C.) | 120 | — | — | — | — |
| Total amount of tackifier resin |  | 120 | 180 | 90 | 150 | 70 |
| Softening agent [parts] | PX300N | — | 20 | 10 | 5 | — |
|  | PW-90 | 30 | — | — | — | 10 |
| To-foam adhesive strength [N/10 mm] |  | 6.7 | 0.5 | 0.7 | 0.8 | 0.9 |
| 70° C. cohesive strength [mm] |  | Fell off | 0.6 | 0.6 | Fell off | 1.0 |
| Constant load peeling | Initial [mm] | 1.0 | 0.7 | 1.0 | 1.1 | 0.3 |
|  | After aging test [mm] | 1.4 | 0.8 | 1.2 | 1.5 | 0.45 |
| Preservability (decreasing rate after aging test) [%] |  | 40.0 | 14.3 | 20.0 | 36.4 | 50.0 |

As illustrated in Tables 1 and 2, the PSA sheets according to Examples 1 to 10 have the to-foam adhesive strength of 3.0 N/10 mm or greater, do not fall off in the 70° C. cohesive strength test, have a peeling property under a constant load with the decreasing rate after the aging test of 50% or less, and all had a sufficient rough surface adhesion, cohesive strength at a high temperature, and preservability. On the other hand, in Comparative Examples 1 to 12, at least one of the to-foam adhesive strength, the 70° C. cohesive strength, or the preservability was inferior.

Specifically, Examples 1 and 2 are the examination results of the content of the aromatic petroleum-based tackifier resin (B) having a softening point in excess of 100° C. From the comparison of the results of Example 1 and the results of Comparative Examples 6 and 8 where any tackifier resin (B) was not used, it is understood that the rough surface adhesion and the cohesive strength at a high temperature can be improved by the content of the tackifier resin (B) being 5 parts or greater. Further, from the comparison of the results of Example 2 and the results of Comparative Examples 9 and 10, it is understood that an excellent rough surface adhesion can be obtained by the content of the tackifier resin (B) being 40 parts by weight or less. Note that, Comparative Example 6 embodies the composition of Example 8 of Patent Literature 1, and Comparative Example 8 embodies the composition of Example 2 of Patent Literature 2. Comparative Example 7 is an example which embodies the composition of Example 2 of Patent Literature 3. Comparative Example 9 is an example in which the amount of the petroleum resin (B) was increased from the composition of Example 4, and Comparative Example 10 is an example in which the amount of the aromatic petroleum resin (B) was increased from the composition of Example 3.

Further, from the comparison of the results of Example 3 and 4 and the results of Comparative Examples 9, 11 and 12, it is understood that by the content of the natural product-based tackifier resin (A) being in the range of 40 to 120 parts, and the total amount of the tackifier resin being in the range of 60 to 160 parts, a sufficient rough surface adhesion can be obtained. Further, from the results of Comparative Example 11, it is understood that if the content of the natural product-based tackifier resin (A) is too high, the cohesive strength at a high temperature decreases. Note that, Comparative Example 11 is an example in which the amount of the natural product-based tackifier resin (A) was increased compared to the composition of Example 10, and Comparative Example 12 is an example in which the amount of the natural product-based tackifier resin (A) was decreased compared to the composition of Example 2.

Examples 5 and 6 and Comparative Example 5 are the examination results of the softening point of the aromatic petroleum-based tackifier resin (B), and it is understood from these comparisons that the cohesive strength at a high temperature improves by the softening point of the aromatic petroleum-based tackifier resin (B) being in excess of 100° C. Further, Examples 7 and 8 and Comparative Example 4 are the examination results of the softening point of the natural product-based tackifier resin (A), and it is understood that both the rough surface adhesion and the cohesive strength at a high temperature can be obtained by use of the natural product-based tackifier resin (A) in which the softening point is in excess of 80° C. Further, Examples 9 and 10 and Comparative Examples 1 and 2 are the examination results of the softening agent amount, and it is understood that both the rough surface adhesion and the cohesive strength at a high temperature can be obtained by making the amount of the softening agent within the range of 5 to 40 parts. Note that, Comparative Example 5 is an example in which the aromatic petroleum-based tackifier resin (B) in the composition of Example 2 was replaced with a resin having a low softening point. Comparative Example 4 is an example in which the natural product-based tackifier resin (A) in the composition of Example 5 was replaced with a resin having a low softening point. Comparative Examples 1 and 2 are examples in which the softening agent amount was modified from the composition of Example 2.

Note that, in Comparative Example 3, although the fact that the result of the initial constant load peeling test was good, the peeling property under a constant load after the aging test lowered, and the preservability could not be obtained. Comparative Example 3 is an example which used a terpene phenol resin in place of the natural product-based tackifier resin (A) in the composition of Example 7, however, it is considered that the PSA deteriorated due to the use of the terpene phenol resin.

From the results, it is understood that the PSA composition comprising a block copolymer of a monovinyl-substituted aromatic compound and a conjugated diene compound, a tackifier resin, and a softening agent, and comprising a natural product-based tackifier resin (A) having a softening point in excess of 80° C. and containing no aromatic ring, and a petroleum-based tackifier resin (B) having a softening point in excess of 100° C. and containing an aromatic ring, wherein the content of the tackifier resin (A) is 40 to 120 parts by weight with respect to 100 parts by weight of the block copolymer, the content of the tackifier resin (B) is 5 to 40 parts by weight with respect to 100 parts by weight of the block copolymer, the total amount of the tackifier resin is 60 to 160 parts by weight with respect to 100 parts by weight of the block copolymer, and the content of the softening agent is 5 to 40 parts by weight with respect to 100 parts by weight of the block copolymer, can form a PSA which obtains both the rough surface adhesion and the cohesive strength at a high temperature and has a good preservability.

Although specific embodiments of the present invention have been described in detail above, these are merely for illustration and do not limit the scope of the claims. The art according to the claims includes various modifications and changes made to the specific embodiments illustrated above.

DESCRIPTION OF REFERENCE NUMERALS 1, 2, 3 PSA sheet
11 first PSA layer
12 second PSA layer
15 substrate
21, 22 release liner

What is claimed is:

1. A pressure-sensitive adhesive composition comprising: a block copolymer of a monovinyl-substituted aromatic compound and a conjugated diene compound; a tackifier resin; and a softening agent, wherein
the tackifier resin comprises:
a natural product-based tackifier resin (A) having a softening point of 100° C. or higher and 200° C. or lower, and containing no aromatic ring; and
a petroleum-based tackifier resin (B) having a softening point of 125° C. or higher and 200° C. or lower, and containing an aromatic ring,
the tackifier resin (A) is contained in an amount of 40 parts by weight or greater and 120 parts by weight or less with respect to 100 parts by weight of the block copolymer,
the tackifier resin (B) is contained in an amount of 5 parts by weight or greater and 40 parts by weight or less with respect to 100 parts by weight of the block copolymer,
the total amount of the tackifier resin is 60 parts by weight or greater and 160 parts by weight or less with respect to 100 parts by weight of the block copolymer, and
the softening agent is contained in an amount of 5 parts by weight or greater and 40 parts by weight or less with respect to 100 parts by weight of the block copolymer,
the tackifier resin (A) comprises:
a tackifier resin (A1) wherein the tackifier resin (A1) is a terpene resin having a softening point of 100° C. or higher and 200° C. or lower; and
a tackifier resin (A2) wherein the tackifier resin (A2) is a rosin-based resin having a softening point of 120° C. or higher and 200° C. or lower, and
the tackifier resin (A1) and the tackifier resin (A2) are contained to satisfy a ratio (A1/A2) of ⅓ or greater and 3 or less on weight basis, wherein A1 is the amount of the tackifier resin (A1) and A2 is the amount of the tackifier resin (A2).

2. The pressure-sensitive adhesive composition according to claim 1, wherein the tackifier resin (A2) has a softening point of 150° C. or higher and 200° C. or lower.

3. The pressure-sensitive adhesive composition according to claim 1, wherein the amount of a phenol-based tackifier resin is less than 1 part by weight with respect to 100 parts by weight of the block copolymer.

4. The pressure-sensitive adhesive composition according to claim 1, wherein the block copolymer is a styrene-based block copolymer.

5. The pressure-sensitive adhesive composition according to claim 1, wherein the block copolymer is a styrene-isoprene block copolymer.

6. The pressure-sensitive adhesive composition according to claim 4, wherein the styrene content of the styrene-based block copolymer is 10 wt % to 22 wt %.

7. A pressure-sensitive adhesive sheet having a pressure-sensitive adhesive layer formed from the pressure-sensitive adhesive composition according to claim 1.

8. The pressure-sensitive adhesive composition according to claim 1, wherein the softening agent comprises at least one selected from the group consisting of polybutene, polyisoprene, liquid terpene resin, liquid rosin-based resin, higher fatty acid ester and fatty acid amides.

9. The pressure-sensitive adhesive sheet according to claim 7, wherein the pressure-sensitive adhesive sheet has an overall thickness of 150 µm or less.

10. The pressure-sensitive adhesive sheet according to claim 7, wherein the pressure-sensitive adhesive sheet is a double-sided pressure-sensitive adhesive sheet consisting of the pressure-sensitive adhesive layer.

11. The pressure-sensitive adhesive composition according to claim 1, wherein the softening agent is in liquid form at 25° C.

12. The pressure-sensitive adhesive composition according to claim 1, wherein the softening agent is at least one selected from the group consisting of liquid rubbers, process oil and liquid resins.

13. A pressure-sensitive adhesive sheet having a pressure-sensitive adhesive layer, wherein
the pressure-sensitive adhesive layer comprises a block copolymer of a monovinyl-substituted aromatic compound and a conjugated diene compound, and a tackifier resin,
wherein the tackifier resin comprises:
a natural product-based tackifier resin (A) having a softening point of 100° C. or higher and 200° C. or lower, and containing no aromatic ring; and
a petroleum-based tackifier resin (B) having a softening point of 125° C. or higher and 200° C. or lower, and containing an aromatic ring,
the tackifier resin (A) comprises:
a tackifier resin (A1) wherein the tackifier resin (A1) is a terpene resin having a softening point of 100° C. or higher and 200° C. or lower; and
a tackifier resin (A2) wherein the tackifier resin (A2) is a rosin-based resin having a softening point of 120° C. or higher and 200° C. or lower, the tackifier resin (A1) and the tackifier resin (A2) are contained to satisfy a ratio (A1/A2) of ⅓ or greater and 3 or less on weight basis, wherein A1 is the amount of the tackifier resin (A1) and A2 is the amount of the tackifier resin (A2), the amount of a phenol-based tackifier resin in the pressure-sensitive adhesive layer is less than 1 part by weight with respect to 100 parts by weight of the block copolymer, and the pressure-sensitive adhesive sheet satisfies the following characteristics:

having an adhesive strength to a soft urethane foam of 3 N/10 mm or greater, wherein the adhesive strength is measured in an environment of 23° C. and 50% RH under the conditions of a tensile speed of 300 mm/min and a peel angle of 180 degrees; and not falling off in a cohesive strength test for a stainless steel plate measured under the conditions of a temperature of 70° C., an adhered area of 10 mm×30 mm, a load of 500 g, and a holding time of 1 hour.

14. The pressure-sensitive adhesive sheet according to claim 13, wherein the tackifier resin (A2) has a softening point of 150° C. or higher and 200° C. or lower.

15. The pressure-sensitive adhesive sheet according to claim 13, wherein the pressure-sensitive adhesive layer comprises a softening agent, and the softening agent comprises at least one selected from the group consisting of polybutene, polyisoprene, liquid terpene resin, liquid rosin-based resin, higher fatty acid ester and fatty acid amides.

16. The pressure-sensitive adhesive sheet according to claim 13, wherein the pressure-sensitive adhesive sheet has an overall thickness of 150 μm or less.

17. The pressure-sensitive adhesive sheet according to claim 13, wherein the pressure-sensitive adhesive sheet is a double-sided pressure-sensitive adhesive sheet consisting of the pressure-sensitive adhesive layer.

18. The pressure-sensitive adhesive sheet according to claim 13, wherein the pressure-sensitive adhesive layer comprises a softening agent, and the softening agent is in liquid form at 25° C.

19. The pressure-sensitive adhesive sheet according to claim 13, wherein the pressure-sensitive adhesive layer comprises a softening agent, and the softening agent is at least one selected from the group consisting of liquid rubbers, process oil and liquid resins.

* * * * *